(12) United States Patent
Werth et al.

(10) Patent No.: US 9,965,462 B2
(45) Date of Patent: May 8, 2018

(54) SYSTEMS AND METHODS FOR IDENTIFYING AND RECORDING THE SENTIMENT OF A MESSAGE, POSTING, OR OTHER ONLINE COMMUNICATION USING AN EXPLICIT SENTIMENT IDENTIFIER

(71) Applicant: TENGRADE, INC., New York, NY (US)

(72) Inventors: Theodore J. Werth, Los Angeles, CA (US); Stuart Strumwasser, Brooklyn, NY (US)

(73) Assignee: TENGRADE, INC., Los Angeles, CA (US)

( * ) Notice: Subject to any disclaimer, the term of this patent is extended or adjusted under 35 U.S.C. 154(b) by 57 days.

(21) Appl. No.: 14/456,795

(22) Filed: Aug. 11, 2014

(65) Prior Publication Data

US 2015/0149153 A1 May 28, 2015

Related U.S. Application Data

(60) Provisional application No. 61/864,246, filed on Aug. 9, 2013.

(51) Int. Cl.
  *G06F 17/27* (2006.01)
  *G06F 17/20* (2006.01)
(52) U.S. Cl.
  CPC ................ *G06F 17/2785* (2013.01)
(58) Field of Classification Search
  None
  See application file for complete search history.

(56) References Cited

U.S. PATENT DOCUMENTS

| | | | |
|---|---|---|---|
| 7,970,891 B1 | 6/2011 | Kontothanssis | |
| 2004/0092250 A1 | 5/2004 | Valloppillil | |
| 2004/0128112 A1 | 7/2004 | Mikytuck, Jr. et al. | |
| 2007/0046674 A1 | 3/2007 | Sudoh | |
| 2008/0040485 A1 | 2/2008 | Glasgow | |
| 2008/0208714 A1* | 8/2008 | Sundaresan ............ | G06Q 10/10 705/26.3 |
| 2008/0270449 A1 | 10/2008 | Gossweiler et al. | |
| 2009/0063247 A1 | 3/2009 | Burgess et al. | |
| 2009/0164450 A1 | 6/2009 | Martinez et al. | |
| 2009/0216577 A1 | 8/2009 | Killebrew | |
| 2009/0239505 A1 | 9/2009 | Ramakrishnan | |
| 2009/0299824 A1 | 12/2009 | Barnes, Jr. | |
| 2010/0119053 A1 | 5/2010 | Goeldi | |
| 2010/0131443 A1 | 5/2010 | Agarwal et al. | |
| 2012/0077521 A1 | 3/2012 | Boldyrev et al. | |
| 2012/0240062 A1 | 9/2012 | Passmore | |

(Continued)

OTHER PUBLICATIONS

Osakabentures, Osakabentures, Mar. 5, 2013.*

(Continued)

*Primary Examiner* — Marcus T Riley

(74) *Attorney, Agent, or Firm* — Westerman, Hattori, Daniels & Adrian, LLP

(57) ABSTRACT

In some embodiments, a user expresses his/her sentiment in a message, blog post, social media post, or other online communication and explicitly identifies that sentiment with a symbol (such as an asterisk). This explicitly identified sentiment is recorded in a database of individual and public opinions.

16 Claims, 21 Drawing Sheets

(56) References Cited

U.S. PATENT DOCUMENTS

2013/0346188 A1* 12/2013 Scholz ............... G06Q 10/10
705/14.43
2014/0019118 A1* 1/2014 Tromp ............... G06F 17/274
704/9
2015/0149153 A1* 5/2015 Werth ............... G06F 17/2785
704/9

OTHER PUBLICATIONS

Scholz et al., Scholz, Mar. 15, 2011, WIPO PCT WO 2012/125159.*
Gooding, Alex. Running an interactive forum in the 21st century-Poll Everywhere. Sociamind, Jul. 24, 2009 [blog online], [retrieved on Dec. 22, 2013]. Retrieved from the internet: <URL: http://sociamind.wordpress.com/2009/07/24/running-an-interactive-forum-in-the-21st-century--poll-everywhere/>;<URL:http://ww.polleverywhere.com/guide>. Cited in ISR dated Jan. 10, 2014.
International Search Report "ISR" dated Jan. 10, 2014, issued in International Application No. PCT/US13/45604.
Written Opinion dated Jan. 10, 2014 issued in application No. PCT/US13/45604.
"Star Tags: Why won't people use them? *9", Locker Gnome Community-Powered Questions & Answers, http://lockergnome.net/questions/87444/star-tags-why-wont-people-use-them-9.html, Aug. 23, 2010, (2 pages).
Co-Pending U.S. Appl. No. 13/831,375.

* cited by examiner

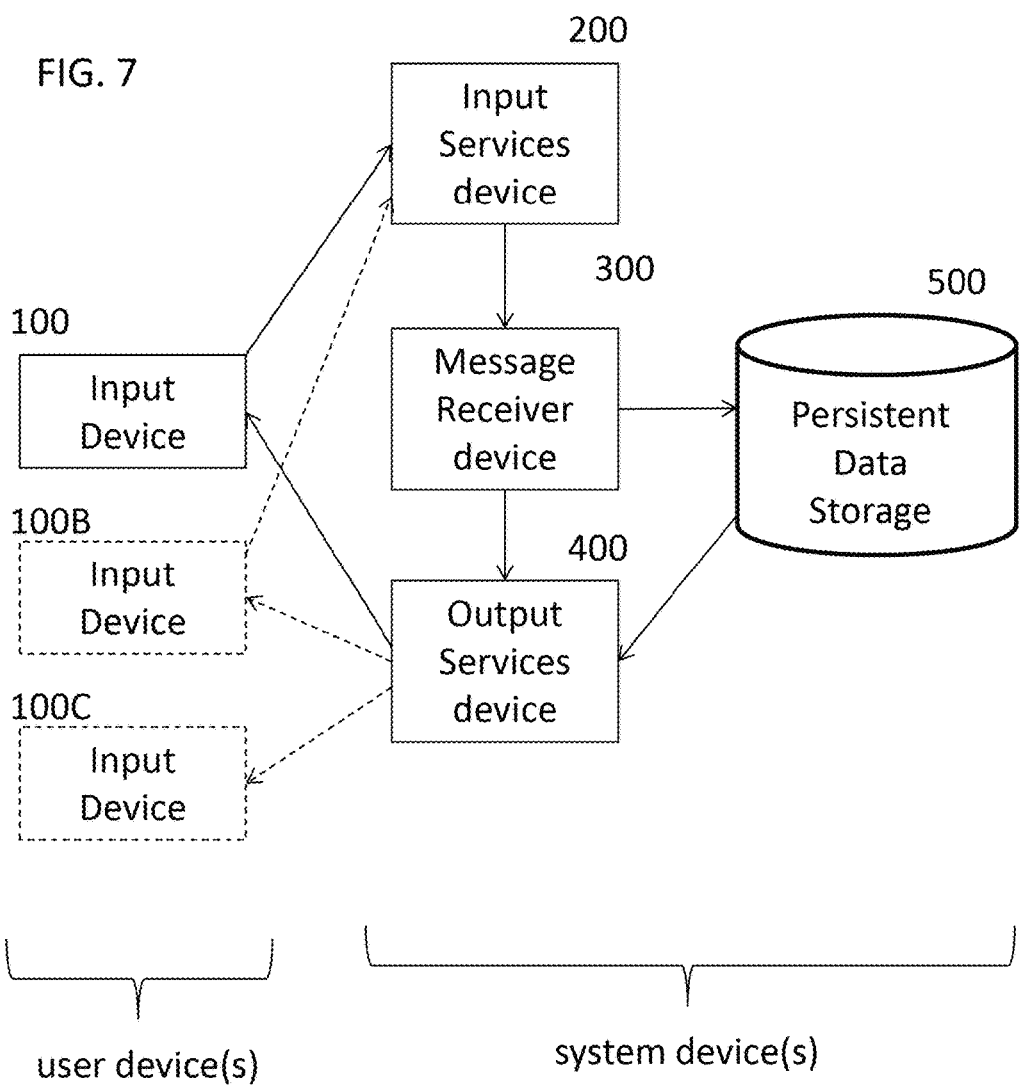

(continued at Fig. 8(B))

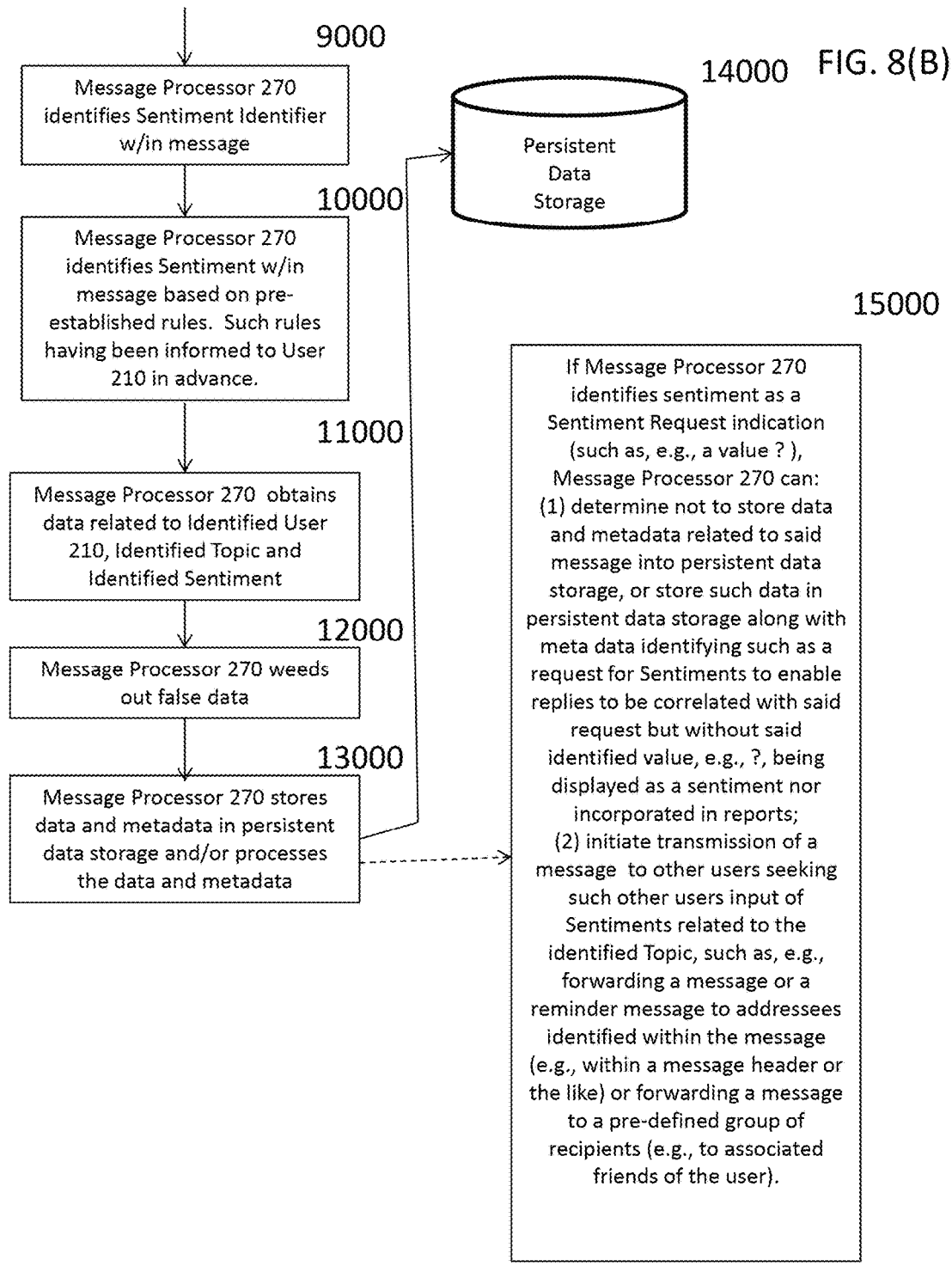

FIG. 13(A)

Illustrative Message Format

| header | user info. | tengrade value | text string | other |
|--------|-----------|----------------|-------------|-------|

FIG. 13(B)

Illustrative Database Format

Topic A:

| user | value | Time | A | B | C | D | E | F |
|------|-------|------|---|---|---|---|---|---|
| Ab | 9 | 01:01 | | X | | | | |
| Bc | 6 | 01:03 | | | X | | | |
| Cd | 7 | 01:13 | | X | | | | |
| De | 8 | 01:23 | | | X | X | | |
| Ef | 10 | 01:29 | | | | | X | X |
| Fg | 2 | 01:43 | | | | | X | |
| Gh | 9 | 01:44 | | | X | | | |
| Hi | 8 | 01:49 | | | | | X | |

CHART SHOWING ILLUSTRATIVE DEFAULT REPLY:

Showing Current Tengrade Average Value and Recent Time Based History (e.g., over the last X hours, or X days, or X months or the like)

Profile Page – User Ab

Likes:

| Topic | Tengrade Value |
|---|---|
| LALakers | 10 |
| Pizza | 9 |
| Beer | 10 |
| Labradors | 10 |

Dislikes:

| Topic | Tengrade Value |
|---|---|
| NYKnicks | 3 |
| Sushi | 2 |
| SpringWater | 2 |
| Poodles | 4 |

FIG. 15(A)

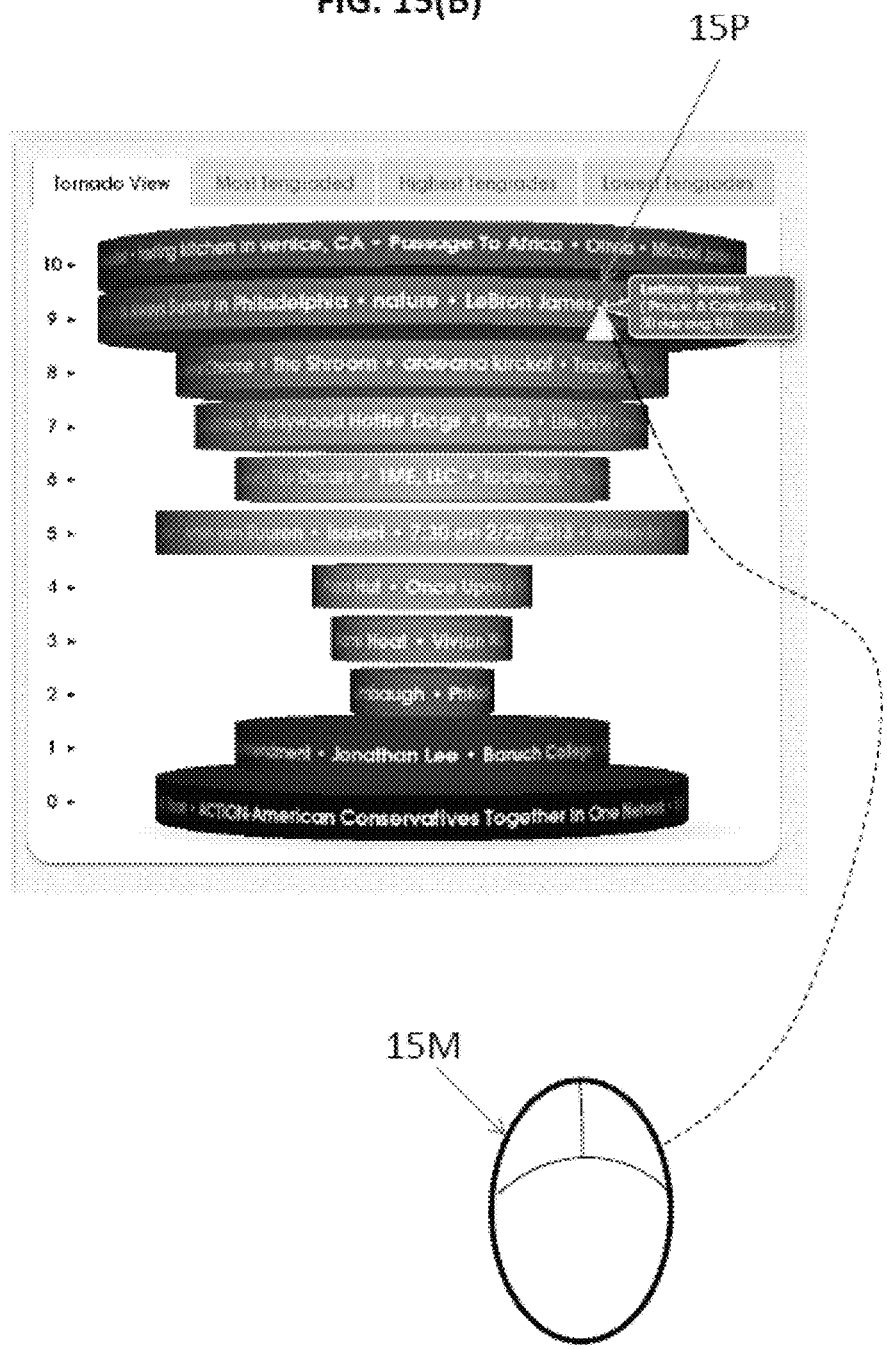

SYSTEMS AND METHODS FOR IDENTIFYING AND RECORDING THE SENTIMENT OF A MESSAGE, POSTING, OR OTHER ONLINE COMMUNICATION USING AN EXPLICIT SENTIMENT IDENTIFIER

The entire disclosure of the following pending U.S. application is incorporated herein by reference as though recited herein in full: U.S. Ser. No. 13/831,375, entitled SYSTEM AND METHOD FOR INPUTTING END-USER SELECTED ELECTRONIC DATA, FOR INPUTTING END-USER-SELECTED GRADATION VALUES OF SAID ELECTRONIC DATA, AND FOR CREATING CORRELATION OUTPUTS OF SAID INPUTTED GRADATION VALUES FOR OPTIMIZATION OF SYSTEMS AND PROCESSES, filed on Mar. 14, 2013 to Stuart Strumwasser and Theodore Werth.

BACKGROUND

Millions of people communicate every day through the Internet and wireless phone networks using text messages, micro-blogs, blogs, posts to social networks, and posts to a variety of other networks of connected devices. In some instances, individuals specify the "topic" of their message using a hashtag, which consists of a word or phrase in conjunction with a hash symbol (#). For example, a baseball fan in Washington, D.C. might tweet a message on Twitter such as "Werth killed it today at the #Nats game." A driver in New York might post a status update on Facebook such as "Was stuck in traffic for 2 hours this morning! #gridlock". This makes it easier for other users, computers, and companies to identify the specific topics of the messages, track what topics people are messaging about, and provide relevant content back to users about specific topics they are, or may be, interested in.

Many companies, advertisers, service providers, and other users seek to similarly understand the sentiment (i.e., the opinion, positivity or negativity, or other emotion) being expressed in these messages. Sentiment tracking is a major component of market research polls and surveys. Sentiment analysis allows companies, politicians, celebrities, scientists, and researchers to better understand what individuals or populations think about a given brand, topic, or person. The sentiment of a user, however, is not necessarily easy to identify within a message. While humans can generally determine the sentiment being expressed, computers must use complex algorithms and language processing software in an attempt to deduce a user's sentiment. These systems are often flawed due to the assumptions they have to make and to the complexities of humor, sarcasm, and slang. In light of this, there is a need for methods and systems to allow users to easily identify their precise sentiment and to make these sentiments recordable and trackable by both humans and computers.

CO-PENDING U.S. APPLICATION

The present invention improves upon applicant's own above-referenced co-pending U.S. Ser. No. 13/831,375 (hereafter, said "co-pending U.S. application"), incorporated by reference above. In this section captioned "Co-Pending U.S. Application," portions of said co-pending U.S. application are inserted herein. In the ensuing paragraphs in this section, the references to preferred embodiments and the invention are references to preferred embodiments and the invention as set forth in said co-pending U.S. application of which the present invention and embodiments of the present invention improve upon. Additionally, in this section, all references to figures correspond to figures of said co-pending U.S. application. For convenience, FIGS. 1, 2, 5, 6, 7, 8, 9, 10, 15A, 15B, 15C and 18 of said co-pending U.S. application are incorporated herein as FIGS. 9, 10, 11, 12, 13A, 13B, 14, 16, 15A, 15B, 15C, and 17, respectively, as set forth in the brief description of the drawings below.

Overview

According to the preferred embodiments of the invention, a novel system and method is provided which enables the acquiring and utilizing of user information related to, e.g., preferences and/or opinions. In the preferred embodiments, the system and method provides a unique method for inputting end-user-selected electronic data, inputting end-user-selected gradation values of said electronic data, and for creating correlation outputs of said inputted gradation values for optimization of systems and processes.

By way of example, in some exemplary applications, a server computer is configured to enable users to remotely input data via their remote user computers (such as, e.g., via a Web Site using browser software, via email, via text message, via Twitter, etc.), such as to enable users to submit a value or grade (herein, referred to as a Tengrade™ value) and to attribute such Tengrade value to a uniquely identified topic. In some illustrative and non-limiting embodiments, the Tengrade value can be an integer between the values of 0 and 10. In other illustrative embodiments, the Tengrade value can be any other alphanumerical value, such as, e.g., a number between 0 and 100, a letter from A to Z, grades A to F commonly used in academia, any number between 0 and 10 (including decimals), etc. Most preferably, however, the Tengrade value will provide a range of selections, including more than one selectable value, and, more preferably, more than three selectable values, and, even more preferably, more than five selectable values, and, even more preferably, at least 10 selectable values. Some most preferred embodiments will employ 10 selectable values. In addition, in the most preferred embodiments, the system will provide some general guidance as to the meaning of the values, such as, e.g., 0 being the worst, 5 being mediocre, and 10 being the very best (as an illustrative example).

As described in further detail below, the preferred embodiments enable users to apply such Tengrade values to specified topics and, in the most preferred embodiments, the system enables users to enter the user's own topics (i.e., the users are not restricted to a set of pre-established topics in the preferred embodiments). Among other things, the system will collect data related to the users that submit such Tengrade submissions, and will track and correlate time signatures and user information in conjunction with the submitted Tengrade submissions. With such collected and correlated data, the system will then be able to create various reports and correlations pertaining to, e.g., average Tengrade values for topics, time-based-variations in Tengrade values for topics, etc.

In contrast to existing systems, the Tengrade system provides, among other things:

1) Very novel and unique methods for providing user-selected "topics" for valuation; for example, in the preferred embodiments, the users can input virtually any text string along with a Tengrade value (in some examples, a numerical value of 0 to 10) therefore. As such, topics are not limited to a particular genre or category (such as, e.g., products, or movies, etc.) and are not limited to pre-designated topics (such as, e.g., specific products, etc.). In contrast, the topics can involve any input character string, including, e.g., that related to a) products, b) services, c) company names, d) people, e) interests, f) news, to anything at all, even g) colors, h) numbers, i) anything that is of interest to a user.

2) Very unique methods for users to input or select such "topics," such as, e.g., via Twitter, E-mail, Text Messaging, Web Sites, etc., greatly enhancing ease of use, especially in remote and/or mobile environments. By way of example, during a DC United Soccer game, should the goal keeper perform a heroic "save," users can Tengrade value the goal keeper's name "Bill Hamid" with a value of, e.g., "10" in real time. Similarly, during attendance of a political speech, attendees can submit Tengrade submissions related to the candidates or speakers in real time.

3) Very unique methods for collecting and utilizing the acquired data, such as, e.g., enabling the determination of a) similarities in views to other users, b) other potentially desired topics (e.g., products, arts, etc.), c) worthwhile investments (e.g., such as, e.g., stocks, real estate and/or other properties), and/or d) other information that can be gleaned based on the Tengrade value data collected. Among other things, this collected data would not only be of great value to users themselves, but also to various corporate entities and/or companies that are involved in the sales of products and/or services. For example, extensive time-based data could be collected demonstrating variations in Tengrade values over time pertaining to companies, products, competitors, competitor products, etc. Among other things, this Tengrade data can also be correlated with user information providing valuable demographic and other information to companies, having great commercial value.

In short, the preferred embodiments provide straightforward mechanisms to provide simple Tengrade values for user-designated topics of any nature, which provides for any easy and pleasant user experience, but which users can rate and/or voice their opinions/likes/dislikes, etc., based on any topic of their interest, quickly and easily. At the same time, that quickly and easily entered information can be compiled into extremely valuable user information.

In some very advantageous embodiments, the following four noteworthy aspects are preferably employed:

Advantageous Front End Aspects:
1) The system provides for the ability for topics to be "end user" generated, whereby creating a very novel and unique user experience and form of communication and expression and sharing of information for users;
2) The system enables "end user" generation via 1) handheld wireless devices and 2) using a substantial number of mechanisms for wireless submission (such as, e.g., remote web site access, email, Twitter, text messaging, etc.), facilitating of the real-time input of Tengrade submissions coincident in time and location to noteworthy events, enhancing a) the value of Tengrade submissions, b) sharing of experiences, c) communication and passing on of information;

Advantageous Back End Aspects:
3) The system stores and provides for the historical tracking of Tengrade data, enabling, e.g., detailed and valuable analysis by tracking Tengrade values and data in time, such as, e.g., enabling review of data value fluctuation corresponding to other time based items, such as, e.g., news, events, weather, calendars, etc.;
4) The system stores such historical data in conjunction with other data, related to, e.g., users that submit such Tengrade submissions, as well as other data, enabling the data to be "sliced-and-diced" by, e.g., identifying variations in Tengrade values in relation to certain data.

As captioned above, the first two aspects above are referred to as "front end" aspects, in that they relate to the initial front end data input from the users. On the other hand, the second two aspects above are referred to as "back end" aspects, in that they relate to novel uses and back end advantages of the data once it is collected.

Among other things, the front end aspects provide very unique and desirable front end benefits for users, such as, e.g., providing users with a great mechanism to voice opinions, and communicate to friends, greatly complementing existing social media mechanisms, like Facebook, Twitter, etc. By way of example, with the preferred embodiments, as a user can input any desired topic and as users can readily submit Tengrade submissions from any remote location, a user can, e.g. in real time submit positive Tengrade submissions and/or negative Tengrade submissions—for example, a patron at a restaurant can have recourse to post an immediate negative Tengrade submission promptly after having their dinner dropped on their lap and/or can submit a positive Tengrade submission promptly after receiving free deserts.

Additional details according to some of the preferred embodiments are set forth below.

Illustrative System Architecture:

a. Illustrative Server Deployment:

In some illustrative examples, the server is deployed on a self managed VPS (Virtual Private Server) running a Linux Operating System.

b. Illustrative Web Server:

In some illustrative examples, the Web Server Engine can be nginx (nginx.org) with Ruby on Rails on Top for the Web Application Framework.

c. Web Application Framework:

In some illustrative examples, the Web Application Framework can be Ruby on Rails running on Rails 3. In some examples, the Ruby version can be Ruby 1.9.2, and the Rails version can be 3.x.x.

d. Web Application:

In some illustrative examples, the Tengrade Web application is a Ruby on Rails application using Rails 3 for the framework and MySQL for the Database Engine.

e. Database(s):

In some preferred embodiments, the system employs at least one database for storing of data. In some preferred embodiments, the system employs at least one MySQL Database that is connected via a Rails ActiveRecord link.

For reference, FIG. 2 depicts an illustrative and non-limiting Database Object Model.

f. Social Network Interfaces:

In the preferred embodiments, functionality of the preferred embodiments, including, e.g., the entry of Tengrade topics and/or Tengrade values or grades can be made through external network interfaces, such as, e.g., via social network interfaces, such as, e.g., Twitter and Facebook.

By way of example, in some preferred embodiments, a user that is logged into Twitter or Facebook can perform user functionality according to the present invention via such external networks, such as, e.g., by accessing user interface screens presented via Twitter or Facebook web sites.

i) Facebook Network Features:

With respect to Facebook, the Facebook social network is found at the Web URL of www (dot) facebook (dot) com. As explained in Wikipedia, this widely used social media tool involves the following.

"Users can create profiles with photos, lists of personal interests, contact information, and other personal information. Users can communicate with friends and other users through private or public messages and a chat feature. They can also create and join interest groups and "like pages" (called "fan pages" until Apr. 19, 2010), some of which are maintained by organizations as a means of advertising . . . . To allay concerns about privacy, Facebook enables users to choose their own privacy settings and choose who can see specific parts of their profile. Facebook requires a user's name and profile picture (if applicable) to be accessible by everyone. Users can control who sees other information they have shared, as well as who can find them in searches, through their privacy settings . . . . To access Facebook, user's utilize an authentication process employing entry of a user name and password."

Further aspects of Facebook and the like social networks via which functionality of the present invention can be implemented in some embodiments are set forth in the following illustrative U.S. Patents, assigned to Facebook, which are all incorporated herein by reference in their entireties as though recited herein in full.

1. U.S. Pat. No. 8,136,145 Network authentication for accessing social networking system information by a third party application;
2. U.S. Pat. No. 8,108,377 Predictive resource identification and phased delivery of structured documents;
3. U.S. Pat. No. 8,099,433 Managing information about relationships in a social network via a social timeline;
4. U.S. Pat. No. 8,081,817 Systems and methods for remote work sessions;
5. U.S. Pat. No. 8,037,093 Feeding updates to landing pages of users of an online social network from external sources;
6. U.S. Pat. No. 8,027,943 Systems and methods for observing responses to invitations by users in a web-based social network;
7. U.S. Pat. No. 8,010,458 System and method for managing information flow between members of an online social network;
8. U.S. Pat. No. 7,970,657 Giving gifts and displaying assets in a social network environment
9. U.S. Pat. No. 7,945,653 Tagging digital media;
10. U.S. Pat. No. 7,933,810 Collectively giving gifts in a social network environment;
11. U.S. Pat. No. 7,890,501 Visual tags for search results generated from social network information;
12. U.S. Pat. No. 7,827,265 System and method for confirming an association in a web-based social network;
13. U.S. Pat. No. 7,827,208 Generating a feed of stories personalized for members of a social network;
14. U.S. Pat. No. 7,809,805 Systems and methods for automatically locating web-based social network members;
15. U.S. Pat. No. 7,797,256 Generating segmented community flyers in a social networking system;
16. U.S. Pat. No. 7,788,260 Ranking search results based on the frequency of clicks on the search results by members of a social network who are within a predetermined degree of separation;
17. U.S. Pat. No. 7,725,492 Managing information about relationships in a social network via a social timeline;
18. U.S. Pat. No. 7,669,123 Dynamically providing a news feed about a user of a social network.

ii) Twitter Network Features:

According to Wikipedia, "Twitter is an online social networking service and micro-blogging service that enables its users to send and read text-based posts of up to 140 characters, known as 'tweets.'" The Twitter Web interface uses the Ruby on Rails framework, deployed on a performance enhanced Ruby Enterprise Edition implementation of Ruby." "Twitter adjusted its web interface, adding a search bar and a sidebar of "trending topics"—the most common phrases appearing in messages . . . . [A]ll messages are instantly indexed and . . . "with this newly launched feature, [Twitter operates as] a discovery engine for finding out what is happening right now."

As explained in Wikipedia, Twitter operates as follows:

"Tweets are publicly visible by default; however, senders can restrict message delivery to just their followers. Users can tweet via the Twitter website, compatible external applications (such as for smartphones), or by Short Message Service (SMS) available in certain countries. While the service is free, accessing it through SMS may incur phone service provider fees . . . . Users may subscribe to other users' tweets—this is known as following and subscribers are known as followers or tweeps (Twitter+peeps). The users can also check the people who are un-subscribing them on Twitter better known as unfollowing via various services . . . . Twitter allows users the ability to update their profile by using their mobile phone either by text messaging or by apps released for certain smartphones/tablets . . . . As a social network, Twitter revolves around the principle of followers. When you choose to follow another Twitter user, that user's tweets appear in reverse chronological order on your main Twitter page. If you follow 20 people, you'll see a mix of tweets scrolling down the page: breakfast-cereal updates, interesting new links, music recommendations, even musings on the future of education . . . . In June 2008, Twitter launched a verification program, allowing celebrities to get their accounts verified. Originally intended to help users verify which celebrity accounts were created by the celebrities themselves (and therefore are not fake), they have since been used to verify accounts of businesses and accounts for public figures who may not actually tweet but still wish to maintain control over the account that bears their name—for example, the Dalai Lama. Verified accounts can be identified by a white check in a blue background, known as a verification badge, next to the user's full name, on the profile itself or next to the name in search results."

With respect to Twitter "messages," Wikipedia further explains:

"Users can group posts together by topic or type by use of hashtags—words or phrases prefixed with a "#" sign. Similarly, the "@" sign followed by a username is used for mentioning or replying to other users. To repost a message from another Twitter user, and share it with one's own followers, the retweet function is symbolized by "RT" in the message . . . . In late 2009, the "Twitter Lists" feature was added, making it possible for users to follow (as well as mention and reply to) ad-hoc lists of authors instead of individual authors . . . . Through SMS, users can communicate with Twitter through five gateway numbers: short codes for the United States, Canada, India, New Zealand, and an Isle of Man-based number for international use. There is also a short code in the United Kingdom which is only accessible to those on the Vodafone, O2 and Orange networks . . . . The messages were initially set to 140-character limit for compatibility with SMS messaging, introducing the shorthand notation and slang commonly used in SMS messages. The 140-character limit has also increased the usage of URL shortening services such as bit.ly, goo.gl, and tr.im, and content-hosting services, such as Twitpic, memozu.com and NotePub to accommodate multimedia content and text longer than 140 characters. Twitter uses its own t.co domain for automatic shortening of all URLs posted on its website."

With respect to Twitter "tweets," Wikipedia further explains that tweets generally include, e.g., News; Spam; Self-promotion; Pointless Babble; Conversational; and Pass-along Value subjects.

With respect to Twitter "content," Wikipedia further explains that:

"There are numerous tools for adding content, monitoring content and conversations including Twitvid (video sharing), TweetDeck, Salesforce.com, HootSuite, and Twitterfeed. Less than half of tweets are posted using the web user interface with most users using third-party applications (based on analysis of 500 million tweets by Sysomos)."

With respect to Twitter "trends," Wikipedia further explains that:

"A word, phrase or topic that is tagged at a greater rate than other tags is said to be a trending topic. Trending topics become popular either through a concerted effort by users or because of an event that prompts people to talk about one specific topic. These topics help Twitter and their users to understand what is happening in the world . . . . Trending topics are sometimes the result of concerted efforts by fans of certain celebrities or cultural phenomena . . . . Twitter's Mar. 30, 2010 blog post announced that the hottest Twitter trending topics will scroll across the Twitter homepage. Users will also be able to find out why a specific topic got to be a trending topic . . . . There have been controversy surrounding the Twitter trending topics: Twitter censored hashtags that their users found offensive. Twitter censored the #Thatsafrican and the #thingsdarkiessay hashtags after users complained that they found the hashtags offensive."

With respect to Twitter "authentication," Wikipedia further explains that:

"As of Aug. 31, 2010, third-party Twitter applications are required to use OAuth, an authentication method that does not require users to enter their password into the authenticating application. Previously, the OAuth authentication method was optional, it is now compulsory and the username/password authentication method has been made redundant and is no longer functional. Twitter stated that the move to OAuth will mean "increased security and a better experience.""

g. Authentication:

According to the preferred embodiments, in order to access and use the functionality of the preferred embodiments, a user is preferably required to authenticate the identity of the user prior to obtaining access to such functionality.

In the preferred embodiments, such authentication can be achieved in a number of ways.

In preferred embodiments, a user can access a web site (such as, e.g., at www (dot) tengrade (dot) com) that presents a user login interface that includes a login screen for entry of a user's user name and password for verification purposes. While user name and password are the preferred form of verification, in other embodiments any other form of verification can be employed, whether, e.g., by means of optical recognition (e.g., finger prints, etc.) and/or by any other means.

In addition, in some preferred embodiments, a user's successful authentication at another trusted site, such as, e.g., Facebook or Twitter, can be relied upon for satisfying such authentication.

Accordingly, in some preferred embodiments, a web site, such as, e.g., www (dot) tengrade (dot) com, can utilize a) Twitter, b) Facebook and/or c) Ruby on Rail's DeviceAuthLogic for user login and registration processing.

h. Application Programming Interfaces (APIs):

According to the preferred embodiments, a web site (such as, e.g., at www (dot) tengrade (dot) com) employs Twitter and/or Facebook APIs for sharing Tengrades to Twitter (i.e., via Tweet functionality) and/or to Facebook (i.e., via Share functionality).

According to the preferred embodiments, the web site uses a Twitter API for Twitter Daemon in order to, e.g., monitor public tweets to a Tengrade twitter account.

According to the preferred embodiments, the web site uses the Google APIs for the Mail Daemon for monitoring Tengrades via email.

While some embodiments may include one or more of such APIs for Twitter, Facebook and Google, in preferred embodiments, APIs are provided for each of these (as well as preferably to other APIs) in order to enhance the manner in which Tengrade values can be submitted by users.

Moreover, as discussed herein, in preferred embodiments, a system according to the present invention can be configured such as to pull information (such as, e.g., identifications of an individual's Facebook "friends" or Twitter "followers" and/or other information from, e.g., Facebook, Twitter, Google and/or the like, and can be configured to post various Tengrade outputs, such as, e.g., Tengrade submissions, reports, results, etc., via such Facebook, Twitter, Google and/or the like social networking cites.

i. Operational Functionality

By way of example, FIG. 1 is a diagram depicting functional components/modules performed by the Tengrade system according to the preferred embodiments of the invention, which components/modules are preferably implemented via software programming stored in said digital data storage and memory or said server and carried out using the processor of the server.

With reference to FIG. 1, a server computer 1 is preferably programmed with a Tengrade program as shown. The Tengrade program is configured in the preferred embodiments to perform further functions and features as described in subsequent sections below.

As shown, the Tengrade software is configured to be accessed by different types of users, including general users and administrative users. As depicted, the system preferably includes an authentication user interface in order to authenticate the administrative or general user. As discussed above, and as shown in FIG. 1, the authentication user interface can operate in conjunction with external authentication functionality of, e.g., Facebook (Facebook OAuth), Twitter, (Twitter OAuth) and/or Ruby on Rail's DeviceAuthLogic. As also shown, the system preferably creates graphical user interfaces for administrative and general users to interact with the system, such interfaces being displayed, in the preferred embodiments, via remote user devices (such as, e.g., mobile devices, etc., as described above).

As also shown, and as discussed above, the system also preferably includes API functionality for interacting with Twitter and Facebook, such as, e.g., using tweet results (Twitter) and/or share/filter (Facebook).

As depicted in FIG. 1, in some preferred embodiments, a user can enter Tengrade data via their remote user device(s) using, e.g., Twitter. In this regard, the server is preferably configured with a Tengrade Twitter Daemon—i.e., a Twitter daemon computer program that runs as a background process, rather than being under the direct control of an interactive user. Preferably, the Tengrade Twitter Daemon is configured to monitor a Tengrade Twitter account for incoming Tengrades, and to update a database for the Tengrade topic received.

As also depicted in FIG. 1, in some preferred embodiments, a user can enter Tengrade data via their remote user device(s) using, e.g., Gmail. In this regard, the server is preferably configured with a Tengrade Gmail Daemon—i.e., a Gmail daemon computer program that runs as a background process, rather than being under the direct control of an interactive user. Preferably, the Gmail Twitter Daemon is configured to monitor a Tengrade Gmail account for incoming Tengrades, and to update a database for the Tengrade topic received.

As also depicted in FIG. 1, in some preferred embodiments, the server is configured with a Twitter API to provide for Tweeting of results (e.g., Tengrade submissions and/or reports related thereto).

As also depicted in FIG. 1, in some preferred embodiments, the server is configured with a Facebook API to provide for Share/Filter of Tengrade results, etc., via Facebook.

As further shown in FIG. 1, the server can be implemented using a nginx (nginx.org) Web Server Engine with Ruby on Rails on Top for the Web Application Framewor, along with a MySQL Database that can be connected using, e.g., a Rails ActiveRecord link.

j. Correlation Outputs and Reports

In the preferred embodiments, the Tengrade server is configured (e.g., programmed) with modules having engines (see, e.g., discussions below) for the generation of various reports and outputs based on compilations of Tengrade data provided by users. By way of example, the site preferably adapted to store time stamp values along with other user profile information along with corresponding Tengrade submissions, by which the system can create reports including, e.g., time based Tengrade variations, Tengrade trends and various other correlation outputs and reports. Moreover, the compiled data can further include user location data (e.g., based on GPS coordinates provided using GPS systems within user devices, router information identified within headers of transmitted Tengrades from user devices and/or the like) for providing further data correlation outputs.

Moreover, the Tengrade server can also be adapted to run correlation analyses alongside external information sources, such as, e.g., stock trends, news sources, product sales, or the like, whereby correlations between such external information sources and time stamped Tengrade value data can be used for management, optimization and/or modification of systems and/or processes.

By way of example, Tengrade values for newly introduced products, such as, e.g., new BEN AND JERRIES ice cream lines can be tracked following the introduction of such new products. Based on time based correlation data, along with geographical and/or other data, specially directed coupons and/or discounts can be provided to address anticipated reactions to such products, such as, e.g., in cases where it is determined that Tengrade values initially increase for a few days, then decrease quickly, which can also be varied regionally based on regional Tengrade variations.

In the preferred embodiments, the Web Site also creates a User Interface for viewing such correlation outputs and reports, along with Tengrade trends (as discussed further below).

In the preferred embodiments, such correlation outputs and reports can be transmitted to users based on user requests and/or in response to user submissions of Tengrade data. In some preferred embodiments, such correlation outputs and reports are specially adapted on a per user basis, based on, e.g., user profile information.

In addition, in the preferred embodiments, fees will be charged for various reports and correlation outputs. Such fees can be, e.g., on a continued basis (e.g., monthly services for running of continued reports), on case-by-case basis or otherwise.

In the preferred embodiments, the server (Web Site) also provides a report mechanism which is closer to the database model. For example, in some embodiments, an Administrator (Admin) shall be able to execute queries on the database (such as, e.g., via report files uploaded on the server), as discussed further below. While in some embodiments, general users would be able to execute queries, in preferred embodiments, Administrators would have greater levels of querying abilities, and can create specialized reports for particular client needs. Among other things, the system would provide considerable value added information to clients enabling greatly improved systems and optimizations of systems and processes based thereon.

In addition, in some embodiments, the system can create very valuable and unique user profile pages, which pages can create a valuable and fun tool for users themselves, such as, e.g., for their own use, for sharing with friends (for example, the system can be configured to allow friends of the user to access such user profile pages, such as, e.g., in some embodiments connecting to Facebook via an Facebook API to allow friends to view such pages according to the user's Facebook sharing preferences). For example, FIG. 15(A) shows an illustrative user profile page that the system can create for a user (which can be provided for the user's own interest and/or which can be made available for third parties, such as, e.g., Facebook friends of the user and/or as valuable data for third parties desiring to offer coupons and/or incentives or the like to such users. In some embodiments, the user profile can include a variety of other data, including charts, graphs in relation to time showing trends and variations, etc. In some other embodiments, the system can also show Tengrade values of a user in conjunction with their friends, which can, e.g., create interesting correlations and information, such as, e.g., enabling a group of friends to discover that they all like pancakes, whereby enabling interesting offers and/or packages to be offered to the group as corporate promotions and/or the like. Moreover, the system can also be configured to run comparisons of user information along with user Tengrade submissions and provide listings of other users with similar profiles—e.g., providing an interesting mechanism for users to meet other users with similar interests. By way of example, the system could be adapted to notify a user of the number of other Tengrade users within their vicinity (e.g., determined via GPS and/or the like data) that have input similar Tengrade values for a current event and/or that also have similar Tengrade profiles. In some embodiments, the system can be configured to provide such information based on user preferences input into the system (such as, e.g., some users can request their information to be shared with other users, which sharing can be based on user data, such as, e.g., college students seeking to meet other college students with similar profiles).

As shown in FIG. 15(A), in some embodiments, the system can display a users tengraded topics in such a manner that the topics are shown one above the other, with, as depicted, higher rated topics shown (for example) above lower rated topics. Among other things, such a profile display of a user's Tengraded topics creates a pictorial representation of that user, which can be advantageous for a variety of purposes. For example, the user himself can readily observe his own Tengrade values for his own informational purposes. Among other things, by having a simplified display of this type, the user can also readily compare his own Tengrade values with values of others, such as, e.g., values of a) the user's friends (such as, e.g., a list of friends inputted into Tengrade.com, the user's list of facebook friends or the like), b) other groups of users, c) categories of users based on user profiles (e.g., age group, salary, marital status, location, etc.), d) categories of users based on similarities of Tengrade profiles or similarities of ratings, etc. Moreover, the user's Tengrade profile can be shared with other users (e.g., shared with the user's facebook friends or other friends or the like) for use by others. Moreover, the user's Tengrade profile can be shared with various entities that can readily gleen substantial information about the user's interests and likes based on their Tengrade profile, which can be readily easily observed visually by a display like that shown in FIG. 15(A).

FIGS. 15(B) and 15(C) show further embodiments that are similar to that shown in FIG. 15(A). Among other things, the embodiments shown in FIGS. 15(B)-15(C) provide an enhanced visual layout and representation of Tengrade values of a user, or of a group of users, or the like.

With reference to FIG. 15(B), as shown, in some embodiments, Tengrade values can be displayed on a computer monitor or display (e.g., whether a desk top personal computer, a lap top computer, a smart phone or any other computer device configured to display, such as, e.g., using browser software for displaying Internet URLs, Web Sites and the like. The type of view depicted in FIG. 15(B) is referred to herein as a Tornado™. In this regard, as in the example depicted in FIG. 15(A), the example shown in FIG. 15(A) is essentially a display of Tengrade topics with higher value topics situated above lower value topics in such a manner to provide a quick reference to a user's or group of user's Tengrade profile (i.e., profile of 10 grade values entered).

As shown in the example of FIG. 15(B), there are 11 stacked topic sections, with values of 0 to 10 shown at the left side of the stack. In the preferred embodiment, each stack is visually depicted as a side view of a disc, with various topics within the respective value (i.e., 0 to 10) shown at the edge of such a disc. As also shown in the figure, the diameter of the disc is preferably proportional to or generally corresponding to the amount of topics at that value. Thus, for example, in the example shown in FIG. 15(B), the top discs adjacent the values 9 and 10 would have the most topics therein, while the disc adjacent the value 2 would have the least topics therein. In this manner, a generally tornado-like format or structure is depicted. Here, it is also preferable that the tornado is color-coordinated, such that the colors range from one end of the tornado to the next. For example, in some embodiments, the disc adjacent the value 0 is substantially black, while the disc adjacent the value 10 is substantially red, and the discs in between these values transition gradually between black and red. As such, the tornado provides a quick visual reference as to the type of user or the user's preferences. In some embodiments, a user's tornado profile can be adjusted so as to provide a specialized display, such as, e.g., displaying a) all of their topics rated, b) only topics within a particular category, c) only topics that are also rated by the user's friends, c) only topics that are in certain pre-designated categories, d) topics in categories for which the user has made purchases and/or the like.

In some preferred embodiments, the tornado is displayed such that the discs adjacent each value are shown as slowly rotating, such as to slowly present various topics within each disc. By way of example, in some embodiments, each disc can be visually shown as rotating such that the topics shown in a respective disc slowly transitions from right to left across the screen, similar to the transition of a common banner advertisement. In this manner, while a particular value (such as, e.g., 10) may have numerous topics therein but only a few topics can be displayed at a time, and the display can be configured so as to run through the list one-by-one while seemingly rotating the disc to present the various topics. Among other things, this rotation of the stacked discs creates a very visually appealing and helpful representation, which has a eye-catching tornado-like (i.e., rotating) appearance.

In some preferred embodiments, when a user causes a pointer or the like on a computer screen to be located over a particular disc, that disc will be caused to visually stop rotating. In that manner, a user can watch to tornado until a topic of interest is displayed and then pause the rotation to review a particular topic and value. By way of example, as shown in FIG. 15(B), a user can operate a computer mouse 15M so as to manipulate the position of a pointer 15P over the display (such as, e.g., over the disc adjacent the value 9 in the illustrative example). In the preferred embodiment, by placement of the pointer over the disc adjacent the value 9, this particular disc will stop being displayed as rotating. Moreover, in some embodiments, further details related to that topic over which the point is hovering can preferably be displayed in a text box, such as, e.g., in the illustrative example which shows, for example, the category under which the topic Lebron James has been categorized, as well as the 30 day average rating of that topic rating.

In some preferred embodiments, a user can manipulate the rotational position of a particular disc by, for example, left clicking the mouse 15M while the pointer 15P is situated over a disc. Preferably, the system is configured such that while the mouse is left clicked, the user can cause the respective disc to rotate either direction (e.g., left or right) and at a faster rate of rotation. In that manner, a user can essentially pan through a particular disc in order to readily observe topics therein in a visually appealing and easy to use format.

With reference to the illustrative example shown in FIG. 15(B), as shown at the top of the display, there is a list of four tabs that a user can click in order to alter the display. In the image shown in FIG. 15(B), the tab "tornado view" has been clicked in order to present a tornado-format view as shown. In some illustrative embodiments, a "Most Tengraded" tab can be clicked so as to provide a listing of the topics that have the highest numbers of Tengrade values input within a period of time. In some embodiments, a "Highest Tengrades" tab can be clicked to provide a list of the topics with the highest Tengrade values. Similarly, in some embodiments, a "Lowest Tengrades" tab can be clicked to provide a list of the topics with the lowest Tengrade values.

As discussed above, in some embodiments, lists or displays, such as, e.g., the tornado type display can be used to display Tengrade profiles and data related to a single user, or a group of users, to all users (i.e., as a widest available group of users), or the like. By way of example, FIG. 15(C) shows the same tornado view shown in FIG. 15(B) in which the discs have rotated so as to display different topics within the same topic lists (i.e., having been shown at different points in time).

In the illustrative example display screen shown in FIG. 15(C), the display screen is shown as including a further screen user interface region 15S that includes three "tabs" that a user can click (e.g., using a common computer mouse as shown in FIG. 15(B)) in order to select different tornados for display. For example, in the illustrative example, the tab "The World" has been selected, whereby the tornado shown in the illustrated tornado view is representative of the entire global set of Tengrade users (i.e., all users). In some preferred embodiments, the tornado shown in this view can be configured so as to show a tornado pertaining to the most rated topics in order to provide a representative showing of the topics of the greatest interest within the world at a particular point in time or time period. By way of example only, in some examples a "The World" tornado could include, e.g., the top 100, 500, 1000, or any other desired number of topics as rated within a particular time period, such as, e.g., within the last 30 days, within a particular day, week, month, year, or from the start of time and/or any other desired time period. In some embodiments, the user can select the tab "My World" in order to present information that pertains to a narrower sub-set of total Tengrade users. By way of example, in the preferred embodiments, the "My World" tab will display a tornado that depicts selections by users that the user is affiliated with or has some other interest or relation in or to, such as, e.g., the user's facebook friends, a group that the user is affiliated with and/or the like. In some embodiments, a user can have a variety of user groups under the My World tab, and different respective tornados can be displayed for different groups. By way of example, in some embodiments, a user may belong to a book club, and may use a tornado related to the individuals in their book club so as to receive ratings and/or inputs related to entertainment, books or the like as desired from such users.

In some embodiments, a user can potentially modify a particular tornado display by, e.g., selecting conditions under which the tornado will be presented, such as, e.g., identifying categories to be displayed, time periods to be displayed, minimum rating numbers, etc., and preferably such identification can be made by a user on a tornado-by-tornado basis—i.e., such that any particular tornado can be modified based on the user's needs.

In some embodiments, a user can click on the tab "rate fb likes," in order to enable a user to post a Tengrade rating to the user's Facebook page. In that regard, in some embodiments, upon clicking on "rate fb likes," a user can be presented with Tengrade ratings for topics that were posted by the user's facebook friends, whereby the user can readily post his own rating for that same topic. Additionally, the user could be enabled to fost his own rating for his own topic on his facebook page, whereby the user's facebook friends would be able to observe and access the user's Tengrade via Facebook. By way of example, FIG. 17 shows illustrative Facebook Tengrade rating postings. In particular, as shown in the illustrative example in FIG. 17 (which is a screenshot of an illustrative Facebook page for a fictional Facebook named Justto Toenablegameuse), a first rating from the fictional user's friend, Stephen P. is shown as posted on the user's "new feed" page, which includes Stephen P.'s ratings of 10 for Snow Beverages at 17TG2 and of 7 for Apple Pie at 17TG1. As discussed within this application, the present invention can be configured so as to operate along with Facebook and/or the like social media cites. Among other things, this will enable a user to promptly present ratings which can be promptly presented to the user's friends via Facebook. While the illustrative example depicts presentation to a particular Facebook page, it should be appreciated that other functionality can be provided in some other examples, such as, e.g., presenting to other social media cites similar to Facebook, to Twitter and/or the like. By way of example, upon entry into a particular form For further illustrative purposes, FIG. 15(C) also illustrates an exemplary and non-limiting embodiment showing an illustrative topic entry and rating window shown at 15TG (which can operate similar to that of embodiments described above—for example, a user can input a text string representative of the topic to be rated in the text box shown, along with clicking on numerical value shown below the text box in this example in order to quickly enter a Tengrade value for a user-selected topic.

For further illustrative purposes, FIG. 15(C) also illustrates an exemplary activity feed display region which can be presented to a user in order to provide interesting activity information to that user. In some embodiments, the activity information can include recent ratings of that user's friends, recent ratings of the general population, recent ratings of that user, and/or other activity information.

It should be appreciated based on the present disclosure that in some preferred embodiments Tengrade data related to user selections can be presented in a variety of manners, and the illustrative examples depicted in FIG. 15(A), FIG. 15(B) and FIG. 15(C) are merely some illustrative embodiments. Among other things, the preferred modes of display, such as, e.g., the use of the vertical listing examples, and the tornado examples shown in these figures can provide, e.g., novel and advantageous systems for a) gathering, b) aggregating and c) displaying data that pertains to topics (e.g., of a wide variety of types, from commercial products, to people, to interests and ideas, to anything else) that demonstrates a degree to which such topics are liked or disliked by a) a particular person, b) a particular group of persons (e.g., friends or the like), c) a particular organization of persons, d) a particular defined set of persons, or e) all persons world-wide. Among other things, defined sets of persons can be identified by, e.g., demographics, psychographics or of types of filters. For example, demographic information by which groups of users could be combined can include a) information input by users in their profiles (e.g., income, age, location, etc.), b) information identified by the system (e.g., such as, e.g., IP addresses of users, system usage tracking (e.g., purchase histories, hours of use, etc.), c) router and/or access points used, d) geographical location identified and/or the like. Moreover, psychographic groups can be created by comparative analyses of various users based on their Tengrade submissions. By way of example, users that generally rate certain categories or topics high or certain categories or topics low can be combined into a certain psychographic group.

k. Users

As discussed above, in the preferred embodiments, there would be two general types of users of the Tengrade system. First, the system Administrator(s) (e.g., back office personnel) who shall be able to Manage Reports and configure specialized queries, etc. Second, the general End User(s) who shall be Tengrading topics to the system, such as, e.g., via the Tengrade Website, via Twitter and/or via E-mail accounts (such as, e.g., Gmail).

Data:

Topics:

According to the preferred embodiments, as indicated above, end users shall be able to submit "topics" to which valuations (aka Tengrade values) are applied. For example, in preferred embodiments, users can input virtually any text string along with a Tengrade value therefore. As such, topics are not limited to a particular genre or category (such as, e.g., products, or movies, etc.) and are not limited to pre-designated topics (such as, e.g., specific products, etc.), but, in contrast, can involve any input character sting, including, e.g., a) products, b) services, c) company names, d) people, e) interests, f) news, to anything at all, even g) colors, h) numbers, i) anything of interest to a user.

In addition, in some preferred embodiments, "topic" functional requirements include the following bullet point features:

Users shall be able to Tengrade any topic they choose.
        Users do not have to choose from a set list of topics.
        Users can input any alphanumeric string of characters or text for such topics as they desire (notably, the varieties of spelling and phrasing will actually create an interesting subset of data analyses).
            For example, the Tengrade of the topic "Obama" may vary significantly from the Tengrade of the topic "President Obama" or "Barack Obama."
    In some embodiments, every single unique spelling of any topic should create a new topic entry in the Tengrade database.
    In other embodiments, the Tengrade system shall employ software to intelligently combine a plurality of Topics into a Master Topic so that, for example, a result could be presented for President Obama that combines all the above terms. By way of example, FIG. 11 shows an illustrative example in which the system has received and stored in its database 8 topics related to President Barack Obama. As shown in this illustrative example, each topic has Tengrade data from various users (u1 . . . ), and the average Tengrade value is shown for illustrative purposes in such figure. Here, it is noteworthy that the valuations may vary between each topic name, despite all relating to the same Master Topic. Here, such variation may relate to connotations and/or other reasons (such as, e.g., the use of the name "Hussein" may potentially correspond to lower Tengrade values). Among other things, such variations may also provide useful data for evaluation, including, e.g., enabling companies to improve advertisements and promotional materials by, e.g., use of names having apparently more widely preferred connotations.
    In some embodiments that employ software for combining topics, the software module for performing such decision-making can employ process steps as set forth in, e.g., FIG. 12.
        As shown, in a first step, the system initiates topic consolidation (such as, e.g., continually or periodically running consolidation routines or upon user request).
        In another step, the system can, e.g., run an alphanumeric comparison—such as, e.g., to compare % of similarity in characters of topic. In some embodiments, this step can suffice for consolidation purposes. However, in other embodiments, other supplemental steps can be employed, such as, e.g., one or more of the following steps.
        In another step, the system can, e.g., run dictionary and/or other electronic informational comparisons—such as, e.g., to compare definitions of topic, whereby to ascertain similarities in meanings of terms.
        In another step, the system can, e.g., run time based comparison of inputted topics—such as, e.g., determining increased likelihood of related topics if proximate in time.
        In another step, the system can, e.g., geographical based comparison of inputted topics—such as, e.g., determining increased likelihood of related topics if geographically proximate.
        In another step, the system can, e.g., check user correlations, such as, e.g., by enabling users to identify similar or related topics to be consolidated—such as, e.g., providing suggestions upon receiving user Tengrade for user's to click and identify, such as, e.g., upon submitting topic, server can present a list of possible correlation topics, which a user can then identify. The system can preferably take into account statistically significant user identifications of correlations, such as, e.g., if 85% of the submitters confirm that Barack Obama is President Obama, then the topics can be consolidated under one of these topics (such as, e.g., the first entered topic).
        In preferred embodiments, upon rendering of a positive decision for consolidation, the system groups the consolidated topic information under one of the topics as a master topic (such as, e.g., the First Entered Topic—or a user-selected best topic name).

Associated Data:

In the preferred embodiments, the system is configured to save additional data along with the transmitted Tengrade message data. In particular, in the preferred embodiments, the system will save the following associated data which will be included associated with each corresponding Tengrade submission saved on the database:

Date (i.e., of Tengrade submission);
    Time of day (i.e., of Tengrade submission);
    Method by which the Tengrade was submitted
        (such as, e.g., via the Tengrade Web Site, via e-mail, via Twitter).

In addition to rendering correlations and reports based on user data (see below), correlations can be rendered based on this associated data. For example, in an illustrative case, there could perhaps be interesting differences, for example, in the Tengrade for "Justin Bieber" as submitted via the Tengrade Web Site compared to as submitted via Twitter.

System Functionality:

a) Registration and Use:

In some preferred embodiments, users of the system (aka the Tengrade system) will be required to be authenticated in some manner to submit Tengrade messages. However, in some embodiments, a formal user registration within the Tengrade system is not required.

i. Anonymous Users

In some preferred embodiments, a user shall not be required to login to the system (such as, e.g. into a Tengrade Web Site) to be able to submit Tengrade messages to submit Tengrade values related to a topic (also referred herein as "to Tengrade" a topic).
    By way of example, in some preferred embodiments, a user can preferably submit Tengrade messages to "Tengrade" a topic using, e.g., email or Twitter methods described herein.
    However, it is noted that Tengrading via such email or Twitter methods does not automatically register a user into the Tengrade system itself.
        That is, while such email and Twitter methodologies enables some level of authentication in terms of confirming similar sources of Tengrade messages (such as, e.g., enabling identification of sender information, such as, e.g., email address, email header information and/or the like in the case of Tengrading via email), a formal user Tengrade system registration with full details is not required.

In some preferred embodiments, the number of Tengrade submissions allowed per user is limited by the Tengrade system. That is, in some embodiments, a user is limited in one or more of the following ways:

- Limiting users ability to Tengrade to a specific number of submission per day on any topic (such as, e.g., once, twice, three times . . . or any other desired number of times per day) or per some other time period, such as, e.g., per hour or the like;
- Limiting users ability to Tengrade to a specific number of submission per day on a per topic basis (such as, e.g., once, twice, three times . . . or any other desired number of times per day) or per some other time period, such as, e.g., per hour or the like, whereby users can perhaps freely Tengrade various topics but may not repeatedly Tengrade the same topics;
- Limiting users ability to Tengrade to certain topics based on, e.g., method of Tengrading and/or other data, such as, e.g., origin of original Tengrade message and/or even based on some user data in the case of known or non-anonymous users.

In some embodiments, even for non-registered or anonymous users, the Tengrade system can be configured to limit Tengrading by users (such as, e.g., limiting each user so that they can only Tengrade a topic once in a particular time period), by performing a data comparison to ascertain if the Tengrade message submitted came from an already used email address, Twitter account or IP address—i.e., depending on which Tengrade submission method was used to provide the Tengrade submission. See discussion below regarding the preferred methods for submitting Tengrade messages.

ii. Registered Users (e.g., Web Application Registration)

In the preferred embodiments, the Tengrade Web Site is configured to enable users to register to the Web Site. Among other things, by registering with the Tengrade Web Site, a number of benefits can be achieved, including, for example, facilitating creation of helpful correlation information (such as, e.g., specialized reports taking into consideration such registration information) that can be of great value/use to the users and/or to other entities.

In some preferred embodiments, a home page "graphical user interface screen" can be presented to users on their home computers via browser software executing on their user devices which can include a registration link directing the user to a screen having a menu for inputting of registration information.

In some illustrative embodiments, registration information can include various personal and demographic information.

By way of example, in some embodiments, some or all of the following information would be included as information required for registration:

E-mail
Username
Password
  (such as, e.g., a minimum of 6 characters)
Password Confirmation
Gender
  Male
  Female
Age
  13-17
  18-24
  25-34
  35-44
  45-54
  55+
Country
  United States
  Canada
  ISO List of Countries follow after US and Canada
Zip Code/Postal Code Similarly, in some embodiments, some or all of the following can be "optionally input" as optional user information:

Ethnicity
  Caucasian
  American Indian or Alaskan Native
  Hawaiian or Pacific Islander
  Asian or Asian American
  Black or African American
  Hispanic or Latino
Marital Status
  Never Been Married
  Married
  Divorced
  Separated
  Widowed
  Domestic Partner
  Other Unmarried Couple
Education (Highest Level)
  No high school
  Some high school
  High school graduate or GED
  Some college
  Associate's degree or 2-year college
  BA, BS or other 4 year degree
  Masters
  Other advanced degree
Income
  $0-$25K
  $25K-$49K
  $50K-74K
  $75K-$99K
  $100K-$149K
  $150K-$199K
  $200K-$299K
  $300K-$499K
  $500K+
Number of Children Under 5 in a household
Number of Children 6-12 in a household
Number of Children Under 13-18 in a household Among other things, knowledge of this personal information can be helpful for facilitating correlation of data for that user and/or for other entities.

In the preferred embodiments, the User would be asked for a Capha text during registration to prevent against bots gaming the registration process. That is, the user would be required to type in certain alphanumeric characters into a web-based form so as to enable the Web Site management to ensure that automatic programs or robots are not used to wrongfully register with the web site.

In the preferred embodiments, the user will be sent a confirmation of registration via email upon successful registration of the user. Preferably, the email will contain a link to a URL associated with the Tengrade server that will result in activation of the account. In some embodiments, the system shall be configured to enable a user to request the server to resend the email with the confirmation link (here, the User should enter the email address they used to register to Tengrade to enable the system to confirm and resend the email).

In some embodiments, in addition to information related to the user that the system can employ to render various correlations based on said user information and Tengrade values—such as, e.g., rendering reports, comparisons, etc., of other users with similar user information—the system can be configured enable the user to input preferences by which to receive various correlations, reports and/or the like. For example, a user can preferably register to receive notifications when Tengrade values reach a specified up and/or lower limit related to one or more particular topic(s), to transmit periodic reports based on certain correlations and/or the like.

Moreover, in some preferred embodiments, such reports, correlations and/or the like can be provided on a fee basis, whereby users can obtain such with the payments of fees. Accordingly, in some embodiments, user information further includes payment information, such as, e.g., credit card data, banking data, pay pal data, and/or other payment information.

iii. User Login into System Web Site

In the preferred embodiments, the system is adapted to enable users to log in to their personal data upon entry of authentication information. In some preferred embodiments, the authentication information would include a user name and password. In some preferred embodiments, the user name can be the user's email address.

Thus, in the preferred embodiments, the user is able to login to the Tengrade web site using the email and password they used to register with the Tengrade system. Accordingly, the User would first be required to activate their account—using the email confirmation sent by the server—before they can login to the system.

iv. Connecting via Twitter

In the preferred embodiments, the user shall be able to use the Twitter OAuth single sign-on mechanism to connect to the Tengrade system.

Preferably, if the user is already logged in via email, the Twitter account shall be linked to the currently logged in user.

Preferably, for first time users, the user shall be asked to complete at least some of the registration process (such as, e.g., by inputting some or all of the above-noted "required fields" on web application registration).

Preferably, the Tengrade system is configured to auto-fill certain user information from within Twitter database files into the Tengrade database files, such as, e.g., auto-filling some or all of the following information from the connected Twitter account:

Name
 Gender
 Age
 Location
 Postal Code

Preferably, the User shall not be required to enter their Tengrade password the next time upon using a "Connect to Twitter" button. In this regard, in some embodiments, the Tengrade web site can present a "Connect to Twitter" button which a user can click onto that will redirect the user to Twitter for authentication/approval, and then bring them back to the Tengrade web site, but now with their Twitter credentials used for authentication.

In addition, as indicated above, the User shall preferably also be able to login using the email and password filled in during the Registration process.

v. Connecting via Facebook

In the preferred embodiments, the user shall be able to use the Facebook OAuth single sign-on mechanism to connect to the Tengrade system.

Preferably, if the user is already logged in via email, the Facebook account shall be linked to the currently logged in user.

Preferably, for first time users, the user shall still be asked to complete at least some of the registration process (such as, e.g., by inputting some or all of the above-noted "required fields" on web application registration).

Preferably, the Tengrade system is configured to auto-fill certain user information from within Facebook database files into the Tengrade database files, such as, e.g., auto-filling some or all of the following information (e.g., from the connected the Facebook account [and/or from the Twitter account]):

Name
 Email
 Gender
 Age
 Location
 Postal Code

Preferably, the User shall not be required to enter their Tengrade password the next time upon using a "Connect to Facebook" button. In this regard, in some embodiments, the Tengrade web site can present a "Connect to Facebook" button which a user can click onto that will redirect the user to Facebook for authentication/approval, and then bring them back to the Tengrade web site, but now with their Facebook credentials used for authentication.

In addition, as indicated above, the User shall preferably also be able to login using the email and password filled in during the Registration process.

b) User Profiles:

As discussed above, the Tengrade system will preferably store user data which can be used for a variety of purposes.

Preferably, some or all of the information gathered during the web application registration process to the Tengrade system shall be available for update on the user profile.

Preferably, the user profile can be accessed by clicking on a username displayed proximate to a logout button on the site.

In addition, the system shall preferably enable a user to view and unlink a currently connected Facebook account to the user's profile. Similarly, the system shall preferably enable a user to view and unlink a currently connected Twitter account to the user's profile.

In the preferred embodiments, a user is required to enter a password before allowing changes to information in the user profile that are committed to the database.

c) Methods of Submitting & Returning Results:

In the preferred embodiments, the system is configured to enable users to submit Tengrade submissions via one or more, preferably all, of the following mechanisms: 1) a Tengrade web site; 2) via Twitter; 3) via email; and 4) via text message.

In the preferred embodiments, the system is configured to return a response to the Tengrade-submitting user which includes at least some correlated information; for example, in preferred embodiments, the system is configured to automatically transmit a reply message to the user with a current average Tengrade value associated with their particular topic.

In some preferred embodiments, the users can provide a request (such as, e.g., as part of the original Tengrade submission message, or as another message, or as per the user's profile preferences stored in the database of the Tengrade system) to have certain specific information returned to the user from the Tengrade system. For example, in some embodiments, the user can designate a time period over which to calculate the average Tengrade value (e.g., employing a "Return Protocol" that allows users to specify the time frame requested as described further with respect to some illustrative examples below).

For reference, FIG. 5 is an illustrative flow diagram depicting an illustrative flow during the rendering of a Tengrade submission by a user in which the user inputs the topic textually at a user device and transmits the same to a back end Tengrade server according to some illustrative embodiments. In addition, FIG. 6 is an illustrative flow diagram depicting an illustrative flow during the rendering of a Tengrade submission by a user at a user device in which the user accesses a web site provided via a back end Tengrade server, selects topics from a list displayed, and enters Tengrade values, and transmits the same to the server according to some illustrative embodiments. Moreover, FIG. 7 is an illustrative flow diagram depicting an illustrative message format that can be used to transmit Tengrade submissions to the Tengrade server (e.g. using any desired medium), in which portions of the message are sectioned into specific parts to identify a) the particular user, b) the tengrade value, c) a text string which is to be the topic submitted, and d) other, which can include, e.g. comment information;

In the preferred embodiments, the system preferably stores submitted Tengrade submissions in such a manner as to correlate submissions of users for a similar topic to enable ready correlation of data related thereto, such as, e.g., based on various other data, such as, user data, etc. For example, FIG. 8 is an illustrative diagram depicting an exemplary database containing data related to a particular topic A for a number of users Ab through Hi, with values of Tengrades provided for the topic, times of their submissions of their values, and other user traits or information A through F, which information can be readily employed for the creation of specialized charts, graphs and reports, by selecting subsets of such information to include within such charts, graphs and reports, such as, e.g., showing values for users with certain traits, etc.

In the preferred embodiments, rather than merely receiving the Tengrade submission, the Tengrade server preferably transmits or otherwise presents a response for the Tengrade submitter. By way of example, FIG. 10 is an illustrative flow diagram showing functionality of the Tengrade server in response to receipt of Tengrade submissions from users, including, e.g. a first step of receiving the message, a second step of checking user data for that user transmitting the message in a user database (shown at the right of the figure) and configuring a response based on user preferences and/or responding based on default responses (e.g., automatically just transmitting an average value for the Tengraded topic in some examples), and transmitting a response to the user.

In the preferred embodiments, as described herein, the Tengrade web site is not only configured to present users with results related to their own Tengrade submissions, but is configured to enable a user to observe Tengrade data and ratings of other users. By way of example, the system is preferably configured so as to enable a user to designate a particular user or a group of users (e.g., an organization, a list of friends input into the Tengrade system by the user, the user's list of Facebook friends acquired by the Tengrade system and/or the like). Upon designation of such individual or group, the system is preferable configured to display corresponding Tengrade data pertaining to that group. In the preferred embodiments, as described herein, the Tengrade system also allows the user to identify other conditions by which the Tengrade data will be presented, such as, e.g., conditions related to the user demographics (e.g., which are input into the system via user profile creation and the like), conditions related to categories of topics (e.g., by which users can receive Tengrade information of others based on category, conditions related to geographical location (e.g., of users within a geographical range, which can be determined by address entered in profile, GPS systems, IP addresses, router and/or access point addresses, etc.), conditions related to time periods of Tengrade value inputs (e.g., identifying a time period for which Tengrade values entered are desired to be observed (such as, e.g., within a particular date range, week, month, day, etc.), conditions related to minimum number of Tengrade submissions provided, conditions related to limits of Tengrade topics to display (such as, e.g., the top 100 topics being displayed). By way of example, in this manner, a user can, for example, choose to obtain Tengrade results filtered and displayed for an illustrative subset that satisfies the following conditions: 1) Tengrades by the user's friends, 2) related to films, 3) provided within the last three months, 4) with a minimum of 3 ratings.

For reference, an illustrative flow diagram showing illustrative process steps in some embodiments demonstrating how Tengrade data can be filtered for display to a user is depicted in FIG. 17. As shown, at step 18-1 the Tengrade server has already received and stored all relevant data, such as, e.g., all user profile data entered by users into the Tengrade system, all Tengrade ratings entered by users, etc. At step 18-2, a user transmits a request to the Tengrade system (such as, e.g., via a remote computer, laptop, tablet computer, wireless phone and/or another other device) as described herein, which request identifies information desired to be retrieved and displayed pertaining to Tengrade data. As indicated, the request can include a variety of indicators (e.g., seven indicators shown in this illustrative embodiment in FIG. 17), which indicators can be, e.g., entered into a user interface (such as, e.g., into a forms field displayed on the user's device) and transmitted to the server. As shown at step 18-3, the server filters the Tengrade data based on the request from the user device and the corresponding indicators for filtering of data. As shown at step 18-4, the server is preferably configured to create a graphical display of the filtered results, preferably in the manner of representation requested in the user's request (such as, e.g., whether a listing of Tengrade ratings, a tornado type representation or the like). As shown at step 18-5, the user device is caused to display the graphical display prepared by the server. In some embodiments, the user device can, e.g., execute browser software and the server can provide an Internet web site via which the user device can display the obtained results. In some embodiments, a user device can submit multiple requests such as to present multiple results concurrently using repeated process steps similar to that shown in FIG. 17.

i. Web Site

As indicated above, in the preferred embodiments, a user can enter a Tengrade submission by accessing a form provided via the Tengrade web site. However, in the preferred embodiments, the user will not be required to log in to the system to submit a Tengrade submission, even if such a submission is made via the Tengrade Web Site itself. Among other things, not requiring a formal login for enabling entry of a Tengrade submission may encourage more widespread use of the system.

However, in some embodiments, users that are logged into the Tengrade system may be able to receive additional advantages and/or benefits that will encourage users to log in prior to submitting a Tengrade submission. For example, if a user is logged into the system, then the system can store a record of the Tengrade submission along with other Tengrade submission records of that user and the system can provide correlation information and/or reports related to or based on the Tengrade submissions. Additionally, if a user is logged into the system, then the system can provide pre-selected reports and/or other information based on user preferences previously submitted by the user.

As indicated above, in some preferred embodiments, the number of Tengrade submissions allowed per user is limited by the Tengrade system. That is, in some embodiments, a user is limited in one or more of the following ways: 1) limiting users ability to Tengrade to a specific number of submission per day on any topic (such as, e.g., once, twice, three times . . . or any other desired number of times per day) or per some other time period, such as, e.g., per hour or the like; and/or 2) limiting users ability to Tengrade to a specific number of submission per day on a per topic basis (such as, e.g., once, twice, three times . . . or any other desired number of times per day) or per some other time period, such as, e.g., per hour or the like, whereby users can perhaps freely Tengrade various topics but may not repeatedly Tengrade the same topics.

In some illustrative embodiments, the system can run a check to determine if the user has exceeded certain Tengrade submission limits by performing one or more of the following:

a) If the user is logged in to the Tengrade system, then the system can check its database of Tengrade submissions or a data file of Tengrade submissions as to whether the user's User ID (which can, in some examples, be a user's email address or an alphanumeric ID) was already used to submit a Tengrade submission within a specific time period (such as, e.g, within that particular day. Notably, dates and times can be checked by comparing a time stamp of any recent Tengrade submissions with a current time clock so as to ascertain whether such a prior submission is too proximate in time to allow a new submission.

b) If the user is not logged in to the system, but is using the Tengrade web site to render a Tengrade submission, then the system can still perform some actions to seek to limit repeated submissions by the same user. For example, in some embodiments, the system can the IP address or another address of the user so as to confirm if the user's same computer was already used to enter a Tengrade submission within a particular time period (e.g., for a particular day). Thus, in the preferred embodiments, the user IP addresses are tracked by the system for each submission of a Tengrade rating message.

Once again, in the preferred embodiments, the users of the Tengrade web site can submit entries via a simple form field made available on the web site. And, when users are logged into the system, the system is configured to be able to correlate or link the users' submissions via the form with other data for the user on the web site, thereby storing data related to that particular user and enabling generation of specialized information and reports for that user.

In the preferred embodiments, the Tengrade system is configured to create a graphical representation or chart depicting historical information related to a Tengraded topic. For example, in some illustrative and non-limiting examples, the system can present a chart showing the average Tengrade of a topic over the past 30 days. In some examples, a graph of the Tengrade average over time shall be displayed with the results. In addition, in some examples a craph of the Tengrade volume over time shall be displayed with the results (here: volume refers to the number of persons Tengrading a topic or a certain time period, and can be defined, in some examples, as the number of people Tengrading the topic over a specific time or day.

For illustrative purposes, FIG. 9 depicts an illustrative chart or graph that can be created in some illustrative examples. As shown, the vertical or y-axis of the graph shows the Tengrade average values at particular times and the horizontal or x-axis of the graph shows the time (i.e., shown in this illustrative example as tracking backwards a unit of time with the current time (i.e., at 0) shown at the rightmost end of the figure. Here, the units of time can vary. In some examples, users can even input preferences, including inputting units of time desired to be used for creation of such historical representations of the Tengrade data.

In some embodiments, the system can display one or more such graphs and/or other information on the web site, which can be calculated taking into account a user's Tengrade topic and submission and which can be presented to the user after submission of the topic and Tengrade value. In some preferred embodiments, a user can merely search for topic Tengrade topics and results. For example, a user can input Tengrade topics into a form field and locate topics, whereby a user and select a desired topic and upon selection be presented with such charts, graphs and/or the like. In this manner, users can review the web site merely to observe Tengrade values and correlating information related to various topics without requiring the user to enter a Tengrade submission to obtain such information. In some embodiments, in order to Tengrade a topic, the user will input a name into a form field, while the system will concurrently calculate the current average Tengrade value and display the current average Tengrade value even prior to selecting of the topic. Then, after selection, the system can, in some examples, show any impact of the user's submission (e.g., if there are only a few users submitting Tengrades for a topic, such submission may result in a notable change of the Tengrade value).

In some preferred embodiments, as described herein, the Tengrade system can also or can alternatively be configured to transmit one or more chart, graph or the like to a user—such as, e.g., via email, via text, etc. Once again, as indicated above in some embodiments, users can input desired graphics and/or charts to be presented via the Tengrade web site and/or transmitted via email or the like using a form for entering of user preferences.

In some preferred embodiments, the Tengrade system is configured to calculate and display the following results via the Tengrade web site and/or to transmit such tables via email or the like:

The Average Tengrade for a Topic for the Past Hour;
The Average Tengrade for a Topic for the Past 24 Hours (1 Day);
The Average Tengrade for a Topic for the Past 7 Days (1 Week);
The Average Tengrade for a Topic for the Past 30 days (e.g., 1 Month);
The Average Tengrade for the Past 1 Year;
The Average Tengrade since inception:
   a) Here, inception is preferably defined as the day the first Tengrade for the Topic is made.

In some preferred embodiments, a graph result for each result item (e.g., in the list in the preceding paragraph) shall be available for review by choosing the period from a dropdown control.

In some preferred embodiments, such a graph of results can also be filtered by the user selecting values for a Start Date and for an End Date, which the user can input into a form field on, e.g., the results page. Preferably, the average Tengrade value for that selected period shall also be displayed on the results page.

In some embodiments, rather than directly accessing a web site for entry of Tengrade values by typing in the URL for a particular Web Site, such as, e.g., accessing Tengrade.com directly and entering information, the system can include a local software module that can be downloaded and incorporated within a user's browser software as an ad on, such as, e.g., incorporated within EXPLORER, GOOGLE CHROME or the like, which can enable quick and easy entry of Tengrade submissions, which are directed to the Tengrade server. For example, in some embodiments, as shown in FIG. 16, such a local module can create a link within a user's browser toolbar, such as shown in red "Enter Tengrade Value" in the illustrated example. Upon clicking this link, the system can be adapted to either direct the user to the Tengrade.com web site or to be presented with a form for entry of Tengrade values. In preferred embodiments, the system can identify the topic or can automatically input a topic based on a) the URL of the Web Site, b) data or text within the web page being viewed, and/or c) text highlighted by the user at the time of clicking the link for Enter Tengrade Topic. In this manner, the user can not only readily enter the user's own topic of choice, but the system can facilitate the user's entry of the topic by having mechanisms to auto-fill such user-selected topic based on the foregoing and/or other information. In some embodiments, such a local ad on can be used in conjunction with not only highlighting of items viewed via browser software, but via any highlighted text, whether via browser software, or another medium, such as, e.g., while reading an eBook or while listing to music using an audio ePlayer, a user may highlight desired text and enter a Tengrade therefor in some illustrative examples.

ii. E-Mail

As indicated above, in some preferred embodiments, users can submit Tengrade submissions via email. By way of example, in some embodiments, one or more Tengrade system email addresses can be establish that users will transmit emails to formatted to provide Tengrade submissions.

By way of illustration, in some embodiments, users can submit Tengrade submission via email to the following email address: tengrade@tengrade.com.

In some preferred embodiments, the Tengrade system is configured to monitor each incoming email and to identify Tengrade submissions based on the content of the email, such as, e.g., by automatically checking data within subject fields and/or message bodies.

In some illustrative embodiments, the Tengrade system can be configured to identify Tengrade topic information and values according to the following pre-established rules:

The subject line shall be treated as the "topic" being Tengraded;

The body shall be treated as the Tengrade rating.

In some preferred embodiments, the system can perform some intelligence in review and analysis of submissions to identify submitted information, such as, e.g., correcting obvious mistakes (e.g., based on mistyping or the like), such as, e.g., "Barack Obama %" being interpreted as "Barack Obama" or the like. In some embodiments, before acceptance of a substitution like this based on intelligent review by the system (e.g., employing dictionaries and/or the like), the system will provide the user with the chance to decline the modification by the system, such as, e.g., by providing a link to a correction page or the like in response to receiving the Tengrade submission.

As set forth above, in some embodiments, the system is configured to transmit graphs, results or the like via email. For illustrative purposes, in some examples, the system can be configured to send a reply email that provides the current average Tengrade value for the topic (which can be defined, e.g., as the average for that day or the average for the last week, or month or since inception), along with, in some examples, information showing the historical change of the Tengrade value for the topic.

In some preferred embodiments, when users submit Tengrade values via email, users can also choose to include additional text after their Tengrade value; preferably, such information will also be stored in the Tengrade system database. In some examples, an illustrative e-mail Tengrade submission can look as follows:

To: tengrade@tengrade.com.

Subject: "Coachella"

Body: "9 Rocks It!"

In this immediately preceding example, "Coachella" would be identified as the topic and "9" would be identified as the submitted Tengrade value, while "Rocks It!" would be identified as a comment, stored within the system database.

Among other things, this further data stored within the system database to be used to provide further data mining and other uses. For example, the system could perform textual searches in which this comment information is searched and evaluated. By way of example, if a new soda beverage is found to have an average Tengrade value of 7, a company can glean further information by, e.g., identifying that the most common words within such further comment field were "boring," "flat" and "bitter."

iii. Twitter

As indicated above, in some embodiments, users can submit Tengrade submissions via Twitter. By way of example, in some illustrative examples, users can send such Tengrade submissions by sending a Tweet with the additional Tengrade protocol of "*tg8".

In this illustrative example, the Tengrade value (e.g., numerical value) of the Tengrade submission would be "8".

In some implementations, with respect to the "topic" being Tengraded, the topic will preferably correspond to the most recent (e.g., closest) hash tagged item in the Tweet. By way of example, a complete Tengrade submission with topic and value information can be formatted as follows:

"#LALakers *tg8".

Furthermore, in some embodiments, further comment information can be input in a similar manner to that noted above with respect to submissions via email. For example, in some embodiments, further textual information within the Tweet can be identified as comment information which can be stored by the system in a manner similar to that indicated above. By way of example, a submission with comment could have the following Tweet:

"#LALakers Love Kobe Bryant! *tg8".

Here, in this illustrative example, the topic would be "LALakers," the Tengrade value would be "8", and the comment would be "Love Kobe Bryant!"

In the preferred embodiments, as with email embodiments, upon the user sending a Tweet, the system can be configured to transmit response Tweets with similar information as in embodiments above. For example, if the user sends the Tweet to the Tengrade system username, the user will preferably receive a response Tweet having, e.g., the average Tengrade value for the topic for a given time period.

For example, if a user transmits the following Tweet submission "@tengrade #LALakers Love Kobe Bryant! *tg8", then the system would record an "8" for value and "LALakers" for the topic and "Love Kobe Bryant" for the comment, and would return to the user as a Twitter Mention the average Tengrade over, e.g., the last 30 days.

iv. Text Message

As indicated above, in the preferred embodiments, a user can submit a Tengrade submission utilizing text messaging (e.g., SMS). By way of example, such a system can operate parallel to that with respect to the embodiment for email submissions, whereby users will transmit a text message to one or more Tengrade system addresses (e.g., cellular telephone numbers) in which certain portions of the message are identified as for the topic and certain portions are identified as for the value.

In this document, the terminology text message includes the exchange of brief written text messages between fixed-line phone or mobile phone and fixed or portable devices over a network, such as, e.g., a cellular telephone network, using, e.g., Short Message Service (SMS), Multimedia Messaging Service (MMS) messages and/or the like. Such messages can include text as well as image, video, and sound content.

By way of example, in some embodiments, users can send a text message to a system cellular telephone number (e.g., 1-888-888-8888) which includes section identifiers in the text to enable identification by the Tengrade system to obtain the corresponding information, such as, e.g., a "s:" or, once again, a "#" preceding text to identify the topic (or subject), and a "tg:" or, once again, a *tg" proceeding text to identify a Tengrade value. For example, a text message which indicates "s:LALakers tg:8" can be used to provide a submission similar to that in the preceding section. Similarly, in some embodiments comment information can be included. As before, such comment information can be automatically identified (e.g., as all information not corresponding to topic or Tengrade value. Alternatively, a user can include an identification of the comment portions by, e.g., including a "ic:" preceding a corresponding comment.

Once again, the system can also be adapted to return various information via a reply text message, including, e.g., any of the information noted above, such as, e.g., average Tengrade value for the submitted topic and/or other reports, graphs and/or the like. With respect to both text message and email embodiments, in some examples, the system can be configured to transmit created charts, graphs and/or the like as an attached file, such as, e.g., an attached text file (e.g., using Microsoft WORD, ADOBE PDF and/or the like) and/or an attached image file (i.e., .JPEG, .TIFF, etc.)

d) Locating Topics and Topic Searches:

As indicated above, according to the preferred embodiments, as indicated above, end users shall be able to submit "topics" to which valuations (aka Tengrade values) are applied. For example, in preferred embodiments, users can input virtually any text string along with a Tengrade value therefore. As such, topics are not limited to a particular genre or category (such as, e.g., products, or movies, etc.) and are not limited to pre-designated topics (such as, e.g., specific products, etc.), but, in contrast, can involve any input character sting, including, e.g., a) products, b) services, c) company names, d) people, e) interests, f) news, to anything at all, even g) colors, h) numbers, i) anything of interest to a user.

In the preferred embodiments, the Tengrade system will facilitate users' identification of topics that have already been Tengraded, such as, e.g., to enable a user to find and select a topic in order to a) review the Tengrade results and/or associated data related to such Tengraded topic and/or b) enter the users' own Tengrade submission for the found and selected topic.

With reference to FIG. 14, the system can provide a number of mechanisms to enable users to locate and identify topics. In this regard, FIG. 14 shows an illustrative screen shot that can be caused to be displayed on a user's remote computer (e.g., using browser software executing on the user's computer). As shown, in some embodiments, users can be presented with links to topics in alphabetical format, such that, e.g., a user desiring to Tengrade "Barack Obama" can perhaps enter O and then proceed to isolate "Obama" in a topic list. In some embodiments, the same topic can be alphabetically listed under multiple terms (i.e., such that the system correlates such together while allowing users to locate them via different entries, such as, e.g., Barack Obama and Obama both leading to the same master topic President Barack Obama).

As also shown in FIG. 14, in some embodiments, topics can be organized into categories, such as, e.g., common categories as listed. In some embodiments, upon clicking through to a category, further sub-categories can be presented and/or alphabetical listings under such category and/or sub-category can be presented.

As also shown in FIG. 14, in some embodiments, the system can help to identify categories by employing a smart engine to identify desired categories. For example, in FIG. 14, a user has typed in the four letters "obam." In some illustrative embodiments, a Topic Module within the Tengrade server will run a routine to identify corresponding topics. For example, in the preferred embodiments, the system can read the text input into the form field and return a list of all topics already entered having such a similar text string (or having text close or similar thereto). For example, referring to FIG. 13, a user can enter the text string obam in step 1. Then, the user's computer can transmit the inputted text string to the Tengrade server (such as, e.g., via the Internet or the like). Then, the Tengrade server can use the Topic Module to compare the inputted text data with the complete topic data in its topic database to identify corresponding potential topics and generate a list of potential topics. Then, the server can transmit the generated topic list. And, the user's computer can next display the generated topic list adjacent the inputted text. Preferably, the user can select the appropriate topic by clicking on the corresponding displayed topic. Preferably, as the user changes the desired text, the system will continue to run the above routines via the topic module in real time, such that the displayed topic list will vary in real time corresponding to the changes in the entered text.

In some preferred embodiments, users can locate topics employing a search tool. In preferred embodiments, the search tool can operate in a generally similar manner to that of the Topic Module discussed above. In this regard, users can preferably enter search terms and employing such searched terms, the system can preferably provide a list of topics for selection by the user. In some embodiments, the Tengrade system can employ a Search Module that also allows for certain boolean operations, such as, e.g., AND (contains both terms), OR (contains either term), NOT (omits a term) and/or the like.

Thus, preferably, users will be able to search the Tengrade system, using, e.g., keyword searching and/or other means, to identify topics already present in the Tengrade system.

In addition, in the preferred embodiments, upon clicking on a topic (such as, e.g., selecting a topic displayed in a list of Topics matching certain entered keyword(s)), the user shall be directed to a page or shall be presented with a specialized results page associated with that topic, which page can include current average Tengrade values, various charts, graphs and the like as described above (e.g. which page can also be adapted or configured such as, e.g., to be presented based on user preferences previously input into the system, such as, e.g., to specifically adapt the type of graphs, charts, etc., presented.

e) Tengrade Landing Page:

As indicated above, the preferred embodiments of the present invention employ a server that creates a web site having functionality according to the present invention as discussed herein. In some preferred embodiments, the main or home page (aka. landing page) of the web site created will provide the following functional items:

Sign-In link (e g, a link directing a user to a new screen enabling sign in using their user name and password as described herein);

Registration link (e.g., a link directing a user to a new screen enabling the user to enter certain registration information to establish an account as described herein);

Topic Search (e.g., section enabling a user to enter search alphanumeric text for identification of topics as described herein);

Tengrade Instructions for Twitter and Facebook providing details for operation as described herein.

A Link to or a List of the Most Tengraded Topics (e.g. providing a list of hot or trendy topics being Tengraded over a particular time period—such as, e.g., listing the top 10, 20 or the like topics based on volume of Tengrade submissions during a time period (such as, e.g., for a particular day);

A Link to or a List of the Highest Tengraded Topics (e.g., providing information showing the topics having the highest Tengrade values for a particular time period) (note: in some embodiments, as there may be many high-rated topics, this list can include volume considerations to limit the number of items listed such as, e.g., the largest volume with such highest values);

A Link to or a List of the Lowest Tengraded Topics (e.g., providing information showing the topics having the lowest Tengrade values for a particular time period) (note: in some embodiments, as there may be many high-rated topics, this list can include volume considerations to limit the number of items listed such as, e.g., the largest volume with such lowest values).

With respect to the Tengrade Topic Lists, in the preferred embodiments, there is a set value or a certain minimum number of votes a topic should acquire before it can be counted on the Highest and Lowest Tengraded topics list. For example, in some examples, a topic should not be added to the Highest or Lowest lists unless it receives at least 100 Tengrade submissions. However, it should be understood that the number of submissions can be selected as desired based on circumstances. In some preferred embodiments, the number of votes or submissions required shall be configurable by an Administrator via an Admin interface as depicted in FIG. 1.

f) Administrative Functionality:

In the preferred embodiments, as shown in FIG. 1, the system is configured to enable system administrators to separately administer the system. For example, in some examples, the administrator can login to the administrator (admin) interface via a particular URL, such as, e.g., http://tengrade.com/administration. As indicated above, in the preferred embodiments, the admin shall be required to enter a user name (e.g., email address) and password for access.

In some illustrative embodiments, the Administrator will be able to perform a variety of functions, including, e.g., one or more of the following:

1. Editing and/or removing Tengrade topics that are determined to be inappropriate (such as, e.g., employing profanity, employing other improper language or content, etc.);
2. Performing manual consolidation of topics, such as, e.g., identifying topics to be combined into a master topic;
3. Updating user profile information and/or user preferences, such as to, e.g., enable users to receive specialized reports and/or data (such as, e.g., in cases where specialized reports may be provided upon the payment of fees and/or the like).

In some illustrative embodiments, the Administrator will be able to perform a variety of site setting functions, including, e.g., the ability to View and Update the following settings:

Minimum number of votes required for a Topic to appear in the Highest Tengraded List;

Minimum number of votes required for a Topic to appear in the Lowest Tengraded List; and/or Other Requirements.

In some illustrative embodiments, the Administrator will be able to perform a variety of functions, including, e.g., the ability to view, upload and/or execute specialized reports (as discussed above), including:

The admin will preferably be able to upload report generator files (in some embodiments, report generator files can include plain text files containing an SQL statement);

The admin will preferably be able to see a list of existing report generator files (in some embodiments, the admin will also be able to delete a file on the list);

The admin will be able to execute a report generator file, such as, e.g.,

Clicking on the filename on a list that will cause the system to execute a corresponding SQL statement and make a resulting table to be downloaded as, e.g., a CSV (comma separated values) file.

Preferably, the CSV File generated can then be opened in Excel for further report creation.

g) Database Design:

In some preferred embodiments, the Tengrade server system can employ a database design schema that includes, e.g., features as depicted in, e.g., FIG. 2. As indicated above, in some preferred embodiments, the system employs at least one database for storing of data. In some preferred embodiments, the system employs at least one MySQL Database that is connected via a Rails ActiveRecord link.

h) Illustrative Case Examples:

For reference, some illustrative case examples are described in the context of an illustrative system which provides for user ratings of 0, 1, 2, 3, 4, 5, 6, 7, 8, 9 and 10.

In a first example, a large company, such as, e.g., the COCA COLA CORPORATION, can obtain historical data reports, graphs and/or charts from the Tengrade server, such as, e.g., upon contacting the management persons of Tengrade and paying to receive such information, and/or upon applying for such online via an online form in which details of such reports are inputted, along with entry of appropriate payment information, such as, e.g., credit card information.

In the illustrative example, the system can operate freely and the COCA COLA CORPORATION can wait to receive reports of user Tengrade ratings for their products, which can include, e.g.:
  a. Historical data, including time based reports, graphs or charts depicting variations in the Tengrade values for their own products;
  b. Historical data, including time based reports, graphs or charts depicting variations in the Tengrade values for their competitor's products (here, the system can intelligently identify competitor products and/or companies can enter lists of competitor products to compare);
  c. Historical data, including time based reports, graphs or charts depicting relationship between their own product Tengrade values with respect to one of more of the following:
    a. Competitor product ratings (i.e., which may vary over time);
    b. News, Events, Promotions, Advertising and/or the like (here, the system can intelligently identify news, events, promotions, advertising or the like and/or companies can enter dates or timelines of external events, such as, e.g., their internal marketing activities, commercial activities and/or the like by which the system can automatically correlate relationships between Tengrade values and such activities).

Then, based on the received historical data, the COCA COLA CORPORATION can adjust production, commercial activities and/or other activities based on the results obtained.

For example, if 10000 units of a first product DRINK A are sold in a particular geographical region, the company can modify its production numbers and/or production planning based on the initial Tengrade values received in relation to the product. As the Tengrade values can be in real time and remotely and can have geographical and time associations, the COCA COLA COMPANY can greatly benefit very quickly to learn if the product is likely to sell very quickly. Previously, the company had to primarily judge customer satisfaction strictly by volume and frequency of product purchases. However, with the present system, an earlier judgment can be made (e.g., as customer satisfaction is more plainly indicted) and more direct comparisons to other products (of the same company and of other companies) can be made.

Similarly, the COCA COLA COMPANY could use the data to adjust advertisement activities, such as, e.g., adjusting advertising based on Tengrade report results, which can, e.g., include, among other things, specific demographic data related to the users that have a tendency to like their products. For example, if user profiles show that users that enjoy a certain product tend to dislike Poodles and to like Labradors, then their commercials and/or advertising can be adjusted to incorporate Labradors and/or otherwise adapted to target the desired consumers.

Moreover, in some embodiments, much of the modifications of the companies practices can even be automated, such as, e.g., rendering decisions for products to sell within certain regions solely based on Tengrade values and volume in that region.

In some preferred embodiments, to assist companies, such as, e.g., the COCA COLA CORPORATION, the system can create historical reports, graphs or charts depicting variations in said average or means value of user-selected valuations for corresponding topics (such as, e.g., products) over a time period with external matters, including news, events, and/or company activities. And, in some preferred embodiments, these external matters are entered into the server (such as, e.g., by a system Administrator and/or by a user via a user account—which user can be a regular user desiring to enter Tengrade submissions and/or a corporate user desiring to receive reports based on Tengrade submissions of general users—and the server is configured to automatically correlate such time based external matters within said historical reports, graphs or charts. In order to effect such correlation, the system can, in some illustrative embodiments, simply plot event data such as, e.g., color coded events upon a chart or graphical printout or display of time based Tengrade variations such as, e.g., to enable users to immediately see the correlation between the times of the events and the changes of the Tengrade values. In other embodiments, the system can also add further indications, such as, e.g., indications of noteworthiness (e.g., using gold for indications that strongly suggest high correlations and blue for indications that mildly suggest low correlations in data, which can be, e.g., based on levels of changes received, such as, e.g., merely attributing certain value (e.g., 25% or greater) Tengrade changes within certain times (e.g., one day) as having a certain standard (e.g., gold) and the like.

i) Further Discussion of Illustrative Embodiments:

As set forth herein, in the preferred embodiments, the present invention provides very unique functions that are not even remotely contemplated by background systems and methods. In contrast to existing systems for rating of items and the like, the present invention provides very unique and advantageous functionality and capabilities well beyond existing systems.

For example, according to the preferred embodiments, a very unique system is provided that enables (a) user ratings of user generated topics, (b) wherein said user generated topics are capable of being inputted in a variety of methods (e.g., not merely via a web site, but in preferred embodiments via other mechanisms, such as, e.g., text messaging, email, etc., which greatly facilitate mobility and real-time entry of Tengrade values), and (c) novel and advantageous tracking of ratings over time (e.g., enabling graphing of rating variations over time, along with, for example, correlations of price, volume and/or other data alongside rating data over time).

As another example, according to the preferred embodiments, a very unique system is provided that creates enhanced social usage and benefits in relation to ratings of various topics. As set forth above, in the preferred embodiments, systems and methods are provided by which, among other things, a) a user's personal ratings can be readily provided to the user's friends, or particular groups of users (such as, e.g., transmitting to all Facebook friends of the user via connection to Facebook, transmission to other friends or followers of users via other social applications, such as, e.g., Twitter, and/or by transmission to other groups or networks of users based on user-inputted designations and/or the like), b) a user can readily review ratings of fellow users, whether on an individual level (e.g., reviewing ratings of friends identified via Facebook and/or other mechanisms) and/or on a group level (e.g., reviewing compiled data pertaining to the user's friends (i.e., which friends, as indicated above can be identified based on, e.g., Facebook and/or other social network mechanisms), and/or other designated user groups.

Moreover, the preferred embodiments provide very novel and advantageous mechanisms for displaying of such user rating data (e.g., tornado and other mechanisms for enhanced display and review), both on individual levels and on group levels, which not only facilitates and enhances the goals and advantages discussed in the preceding two paragraphs, but which also greatly facilitate various other advantages and benefits described in other parts of the present application.

SUMMARY

The preferred embodiments address the above-mentioned and/or other problems of the background art.

According to some embodiments, the present invention provides systems and methods for allowing users to express their explicit sentiments within a message, post, or other online communication by identifying their sentiment with a symbol (such as an asterisk), and for recording those sentiments in a database of opinions compiled based on similar online communications from numerous users. This database of opinions can, thus, be very readily created and can provide a great wealth of practical outputs and uses.

An example of a method for allowing users to express their explicit sentiment within a message, post or other online communication includes the use of a user-inputted pre-designated "Sentiment Identifier" in conjunction with a user-inputted "Sentiment". In the preferred embodiments, a Sentiment Identifier is a symbol (such as ^, ~, or *) that signifies that a word, phrase, or number that immediately follows it is specifically intended to be a Sentiment expressed in a message. The Sentiment is the word, phrase, or number that represents the emotion, positivity, negativity, or other feeling being expressed by a user in a message. For example: "I feel so ^happy this morning!" includes a caret (^) as the Sentiment Identifier and "happy" as the Sentiment. In some preferred embodiments, the method can also include a "Topic Identifier" (such as, e.g., a hash symbol) and a "Topic", wherein the Topic is that topic about which the user feels that identified sentiment. For example: "Was stuck in traffic for two hours this morning! #gridlock *hate" includes "#" as the Topic Identifier, "gridlock" as the Topic, "*" as the Sentiment Identifier, and "hate" as the Sentiment. [Note: technically, a hashtag is the combination of the hash symbol with another word or phrase. Together they make a "hashtag".]

In some preferred embodiments, in the absence of a Topic Identifier, the Topic of a message can be pre-defined, and is preferably in some embodiments pre-defined to be or to relate to the user him/herself.

In some preferred embodiments, the method utilizes a quantified sentiment employing a pre-defined scale, such as, e.g., a number on a specified scale (such as 0 to 10, in which "0" represents "hate" and "10" represents "love") to indicate the degree of sentiment (like or dislike) with regard to the Topic of a message. For example: "I really enjoyed the #Nats game tonight *9" includes the Topic "Nats" and the Sentiment "9" meaning "I give the Nats a 9" or "I really like the Nats a lot."

An example of a system for allowing users to express their explicit sentiment within a message, post or other online communication and for tracking and recording these sentiments includes an Input Device via which a User inputs a Message containing a Sentiment Identifier, an Input Service, a Message Receiver, a Message Processor, a Persistent Data Storage, and an Output Service. In some implementations, the User sends a Message that contains a Sentiment Identifier through an Input Service using an Input Device. A Message Receiver receives the Message and a Message Processor parses the message to store the relevant data in the Persistent Data Storage. The data is then accessible through an Output Service. In some preferred embodiments, a system for users to express their explicit sentiment within a message, post or other online communication and for tracking and recording these sentiments is further adapted to provide unique outputs or products that provide information related to data related to the recorded sentiments. In some examples, such outputs or products include reports, graphical representations, data visualizations and/or the like, which can be provided using, e.g., a website, a mobile application, an electronic communication and/or the like, such as to present information related to the recorded sentiments of users regarding various topics, regarding various time periods, regarding volumes of recorded sentiments, regarding other demographic and/or psychographic grouping and/or the like.

The features and advantages described in this summary and in the following detailed description are not all-inclusive, and, particularly, many additional features and advantages will be apparent to one of ordinary skill in the relevant art in view of the drawings, specifications, and claims hereof.

BRIEF DESCRIPTION OF THE DRAWINGS

The preferred embodiments of the present invention are shown by a way of example, and not limitation, in the accompanying figures, in which:

FIG. 7 depicts an illustrative architectural diagram according to some illustrative embodiments;

FIGS. 8(A)-8(C) show illustrative method steps according to some illustrative embodiments;

FIG. 13(A) is a copy of FIG. 7 of said co-pending U.S. application, which is an illustrative flow diagram depicting an illustrative message format that can be used to transmit Tengrade submissions to the Tengrade server (e.g. using any desired medium), in which portions of the message are sectioned into specific parts to identify a) the particular user, b) the tengrade value, c) a text string which is to be the topic submitted, and d) other, which can include, e.g. comment information;

FIG. 13(B) is a copy of FIG. 8 of said co-pending U.S. application, which is an illustrative diagram depicting an exemplary database containing data related to a particular topic A for a number of users Ab through Hi, with values of Tengrades provided for the topic, times of their submissions of their values, and other user traits or information A through F, which information can be readily employed for the creation of specialized charts, graphs and reports, by selecting subsets of such information to include within such charts, graphs and reports, such as, e.g., showing values for users with certain traits, etc.;

FIG. 15A is a copy of FIG. 15A of said co-pending U.S. application, which is an illustrative user profile page that the system can create for a user (which can be provided for the user's own interest and/or which can be made available for third parties, such as, e.g., Facebook friends of the user and/or as valuable data for third parties desiring to offer coupons and/or incentives or the like to such users;

FIG. 15B is a copy of FIG. 15B of said co-pending U.S. application, which is an illustrative tornado-style display of rating profiles similar to that shown in FIG. 15(A) according to some illustrative examples

FIG. 10 is an illustrative flow diagram showing functionality of a Tengrade server in response to receipt of Tengrade submissions from users, including, e.g. a first step of receiving the message, a second step of checking user data for that user transmitting the message in a user database (shown at the right of the figure) and configuring a response based on user preferences and/or responding based on default responses (e.g., automatically just transmitting an average value for the Tengraded topic in some examples), and transmitting a response to the user.

DETAILED DESCRIPTION OF THE PREFERRED EMBODIMENTS

Figure 1:
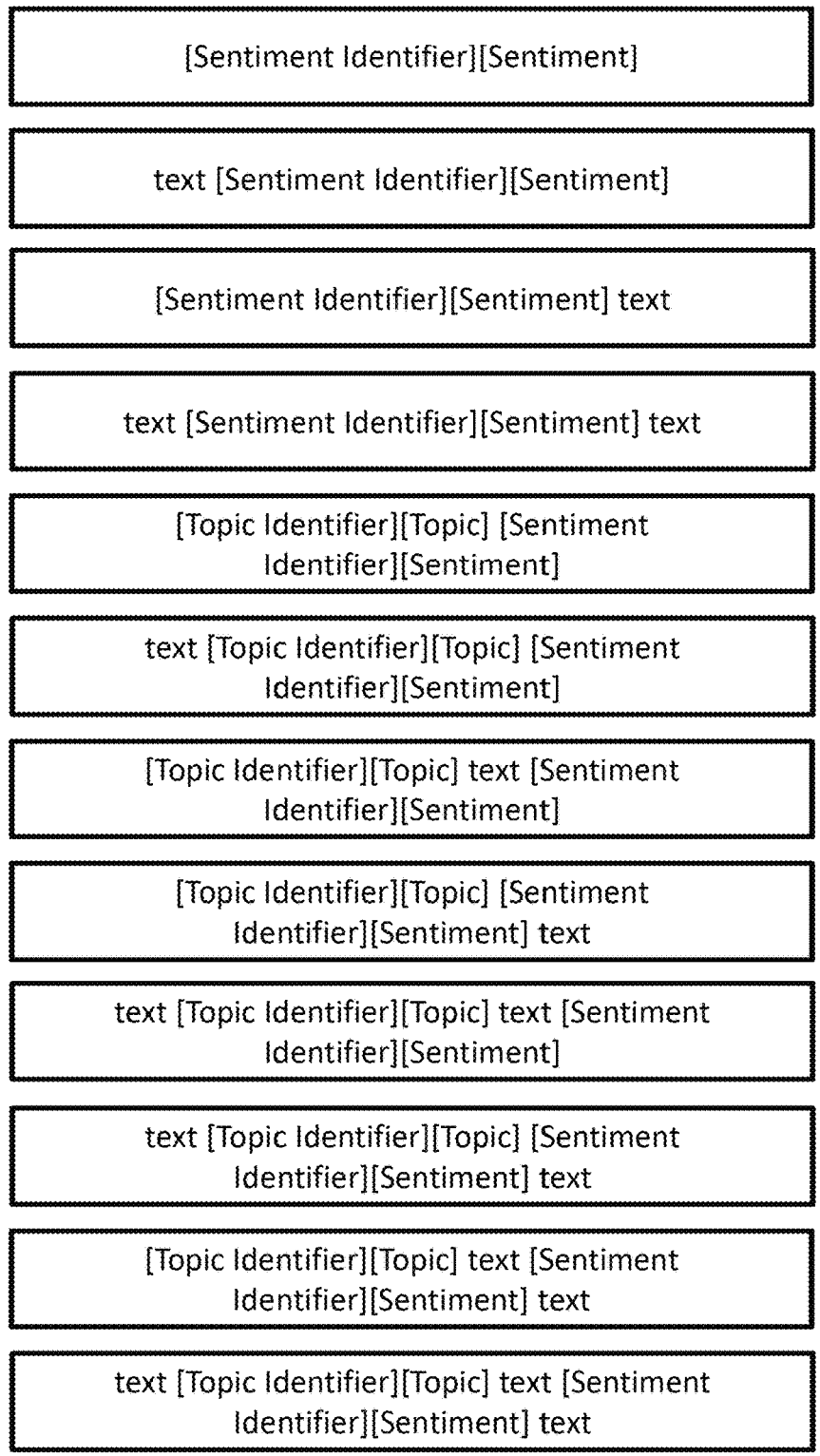
FIG. 1 includes a list of illustrative syntax patterns that represent a method of explicitly identifying the Sentiment of a message using a Sentiment Identifier according to some embodiments of the invention.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein. The following detailed description is intended to provide example implementations to one of ordinary skill in the art, and is not intended to limit the invention to the explicit disclosure, as one of ordinary skill in the art will understand that variations can be substituted that are within the scope of the invention as described.

In some embodiments, a method or system is provided that allows users to express their explicit sentiment within a message, post or other online communication and for tracking and recording these sentiments, as well as for providing outputs and assorted uses and outputs related to these recorded sentiments.

In some embodiments, a method for allowing users to express their explicit sentiment within a message, post or other online communication and for tracking and recording these sentiments includes a User posting a Message containing both a Sentiment Identifier and a Sentiment.

The Sentiment Identifier is preferably a symbol, such as an asterisk (*), caret (^), or tilde (~) which specifically delineates that the word, phrase, or number directly following it is the Sentiment. That is, in the preferred embodiments, a single character symbol is preferably employed that can be readily typed by a user using a common QWERTY keyboard (such as, e.g., employing any keyboard as such in the following U.S. Pat. Nos. 7,372,454 and 5,660,488, the entire disclosures of which are incorporated herein by reference), but preferably does not involve alphanumeric letters or numbers so as to facilitate delineating from text of a message, while enabling easy input and ready identification (such as, e.g., ready identification by a computer system that can readily identify the symbol and then readily attribute the sentiment associated with that symbol). In the preferred embodiments, the Sentiment is predefined in a manner to enable easy input by a user and ready identification of a computer system of the inputted Sentiment. For example, the Sentiment can be predefined to consist of a) alphanumeric text immediately following the Sentiment Identifier until i) a pre-designated character limit, ii) the presence of a particular character, and/or iii) the presence of a space (e.g., input by a user's typing of a space via a common space bar of a QWERTY keyboard).

In the preferred embodiments, a specific Sentiment Identifier is communicated to Users in advance, so that Users know which Sentiment Identifier to use in order for their Messages to be identified by the intended Message Processor. In one embodiment, the Sentiment Identifier is a single symbol character, such as an asterisk. Other examples of a single character Sentiment Identifier include the tilde and caret. Accordingly, the Sentiment Identifier can preferably be inputted (e.g., typed) by manually pressing a single key on a common QWERTY keyboard, or by pressing a first key (e.g., shift key) along with a single key of a QWERTY keyboard.

In the preferred embodiments, the Sentiment is a word, phrase, or number that represents the User's emotion, positivity, negativity, and/or other feeling about a Topic.

In some preferred embodiments, the Sentiment is one continuous string of characters without any spaces, directly following the Sentiment Identifier, without any spaces between the Sentiment Identifier and the Sentiment. That is, in such embodiments, the Sentiment Identifier and the Sentiment are "attached" in one continuous text string.

In some preferred embodiments, the Sentiment is quantified as a number on a scale. One example of this preferred embodiment is a quantified Sentiment on a scale of whole numbers from 0 to 10 in which 0 represents highest negativity (e.g., "hate") and 10 represents highest positivity (e.g., "love").

In the more preferred embodiments, the method also includes the use of a user-inputted explicit Topic Identifier and Topic. One example of a Topic Identifier is a hash symbol, which can be used in conjunction with a word or phrase following it to indicate that the word or phrase is the Topic of a Message.

Together, the hash symbol as Topic Identifier and a word or phrase as the Topic are referred to as a "hashtag."
In some embodiments, when there is no Topic Identifier in the Message, the Topic is deemed to be the User him/herself. For example, in the Message "*happy", the Topic is deemed to be the User and the Sentiment is "happy".

In some embodiments, the Message contains multiple Topics and multiple Sentiments. In these instances, in preferred implementations, each Sentiment is applied to the Topic most closely preceding it in the Message.

As an illustrative case example, the method is demonstrated by the difference between the following two messages:

1. "I hate my coffee addiction, but I do love Starbucks."
2. "#CoffeeAddiction *hate, #Starbucks *love"

While the first message is fairly easy for a human to understand, it requires complex language processing software for a computer to determine its Topics and Sentiments, and it is still subject to misinterpretation. In the second Message, the Topics and the Sentiments felt about each are explicitly identified. "Hate" refers to "CoffeeAddiction" and "love" refers to "Starbucks." Because the Sentiments are explicitly identified by a Sentiment Identifier, they can be parsed by a computer in order to readily compile a database of opinions, and to enable the provision of a great wealth of information and insight to companies and researchers, and to provide various products, advertisements, or content to Users.

Structurally, the use of a single character of a common QWERTY keyboard, wherein such single character is not a letter (e.g., A-Z) or a number (e.g., 0-9+) and is not a punctuation that is statistically frequently used (such as, e.g., a question mark (?), an exclamation point (!), a quotation (")) has technical advantages beyond providing an easy to input or visually observe character for a user. In particular, the use of such single characters is technically advantageous as, among other things, the system will parse through stored messages seeking to identify such characters and associated topics and/or sentiments which is facilitated by such characters. For example, the system can readily locate single characters without complexity of needing to identify strings of characters or the like. As another example, by using single characters that are not statistically frequently employed in messaging, the system will have a lower need to process or evaluate characters that are within a message or posting but that are not employed to indicate topic and/or sentiment, such as, e.g., to reduce processing requirements and to reduce false identifications. Similarly, as the preferred embodiments employ two single characters of this nature, one to identify topic and one to identify sentiment, which characters will be reviewed for proximity to one another, as well as in preferred embodiments, for being within a pre-set order (e.g., one preceding the other), the processing speed will still be fast, while the chances for false identifications will be greatly reduced.

FIG. 1 shows a plurality of different embodiments in which Messages are structured to follow examples of the method. In these illustrative embodiments, the Message may, but is not required to, include a Topic Identifier, Topic, and additional text, along with the Sentiment Identifier and Sentiment. In some embodiments, the system can be configured to process Messages configured such as to include one or more, or all, of the twelve formats shown in FIG. 1. As shown, in a simple format, shown at the top of the twelve examples, a message may include only a Sentiment Identifier and a Sentiment. In the second through fourth of the illustrative formats, the first format can be modified such as to include other text surrounding a Sentiment Identifier and a Sentiment. In such cases, the system will review the message and will identify the Sentiment Identifier and the Sentiment. In the fifth through twelfth examples, the system can be configured to process Messages configured to include Topic Identifiers and Topics followed by Sentiment Identifiers and Sentiments, along with various text located within the Messages at a variety of locations as shown. In such cases, the system will review the messages and will identify the Topic Identifier and the Topic and also the Sentiment Identifier and the Sentiment. In some preferred embodiments, the system will be configured such as to require the Sentiment Identifier and Sentiment to be within a certain predefined proximity to the Topic Identifier and Topic. For example, in some embodiments, the system can be configured to disregard syntax patterns in which a character spacing between the Topic and the Sentiment Identifier is more than 200 characters, or, in some embodiments, more than 100 characters, or, in some embodiments, more than 25 characters, or, in some embodiments, more than 10 characters. Thus, for example, the seventh, ninth, eleventh and twelfth illustrative syntax pattern format examples shown in FIG. 1 could be limited to identify only cases in which the "text" between the Topic and the Sentiment Identifier is below a predefined proximity threshold.

In some embodiments, the method can be adapted to inform others that the User is seeking opinions regarding the other users' Sentiments about a particular Topic, and to get other Users to respond using the method so that the other user's Sentiments can be received and recorded. In a preferred implementation of these embodiments, the Sentiment Identifier is paired with a question mark (?) as opposed to a word, phrase, or number. For example, the message "#radiohead *?" would mean "What do you think of Radiohead?" In response to such a message, other Users can then respond with their own Sentiments paired with the Sentiment Identifier, so that their responses can be easily and accurately displayed and recorded. For example, a User might respond to "#radiohead *?" with "#radiohead *9".

In some embodiments, the method can be adapted to enable users to submit queries to a server that creates and accesses a compiled database of opinions in order to obtain information related to previous results of other Users regarding a Topic. By way of example, in some exemplary cases, a User can include a *? in the body of the Message to notify the owner of the Persistent Data Storage (such as, e.g., within a tweet or other online communication or posting that is delivered to or otherwise made accessible to the server system of the owner of the Persistent Data Storage). This notifies the owner server that the User is seeking results on a specified Topic. For example, the Message "#radiohead *?" would inform the owner of the Persistent Data Storage that the user is asking for results on the Topic "radiohead."

In some embodiments, the method can be adapted to enable users to submit queries to a specific server that creates and accesses the compiled database of opinions in order to obtain information related to previous results of other Users regarding a Topic. By way of example, in some exemplary cases, a User can include an "@" symbol in the body of the Message in conjunction with the username of the owner of the Persistent Data Storage (such as, e.g., within a tweet or other online communication or posting that is delivered to or otherwise made accessible to the server system of the owner of the Persistent Data Storage). This notifies the owner server that the User is seeking results on a specified Topic. For example, the Message "@tengrade #radiohead *?" would inform the Tengrade server that the user is asking for results on the Topic "radiohead."

In a preferred embodiment, a User posts a Message using a hashtag as the Topic Identifier and Topic of the Message, an asterisk as the Sentiment Identifier, and a number on a scale from 0 to 10 (with 0 representing "hate", 5 representing "neutral", and 10 representing "love") as the Sentiment. For example: "Really like #starbucks after their shift to eco-friendly packaging * 8".

In other embodiments, the User may use the method of a hashtag as the Topic Identifier and Topic of a tweet, an asterisk as the Sentiment Identifier, and a word or phrase as the Sentiment. For example: "Drinking my morning #coffee *love".

In other embodiments, the User may use the method of a hashtag as the Topic Identifier and Topic of a tweet, a tilde or other symbol as the Sentiment Identifier, and a word or phrase as the Sentiment. For example: "Drinking my morning #coffee love".

In other embodiments, the User may use the method of a plus sign, caret, or other symbol as the Topic Identifier of a tweet and another symbol as the Sentiment Identifier.

In other embodiments, the User may use the method of not signifying a topic of his/her Message, in which case the Topic is deemed to be the User him/herself. For example: "So *happy today now that the clouds have cleared!" Among other things, by assigning such a Topic to the message, the system can, e.g., compile the data with such a designation in the database, whereby the data can be later used or accessed in the same manner as with other embodiments herein.

In other embodiments, the User may use the method of not including any other text other than the Topic Identifier, Topic, Sentiment Identifier, and Sentiment. For example: "#decaf *3". Among other things, this abbreviated manner of creating messages is very user friendly and facilitates both easy transmission of messages and compilation of data related to such messages.

In other embodiments, the User may use the method of not including any other text other than a Sentiment Identifier and his/her Sentiment. For example: "*happy".

In other embodiments, the User may include multiple Topic Identifiers, Topics, Sentiment Identifiers, and Sentiments within one Message. For example: "#starbucks *8 #peets *9 #CoffeeAddiction *0".

Figure 2:
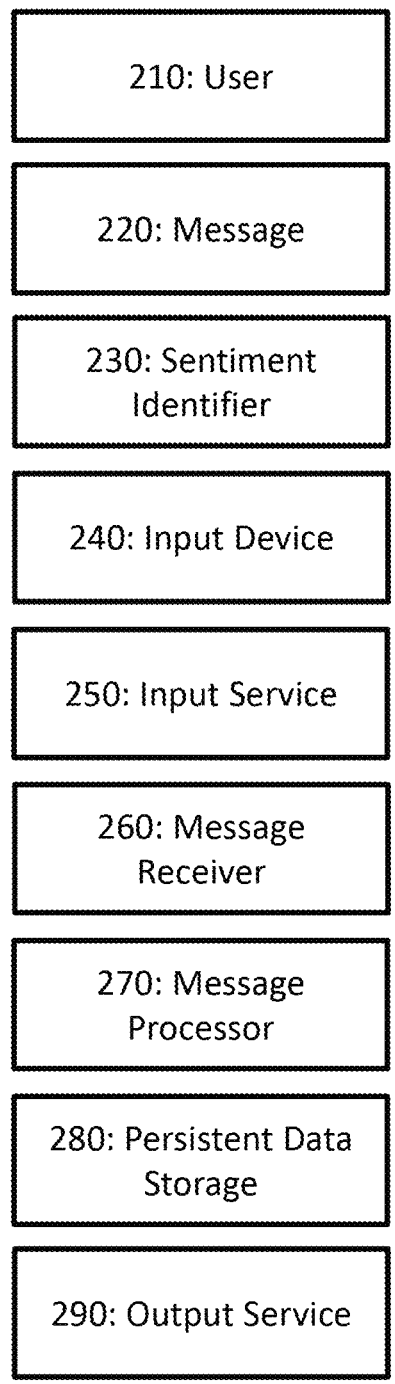
FIG. 2 is a block diagram of the components of a system for receiving and recording the Sentiment explicitly identified by a Sentiment Identifier in a message, posting, or other online communication according to some embodiments of the invention.
Figure 3:
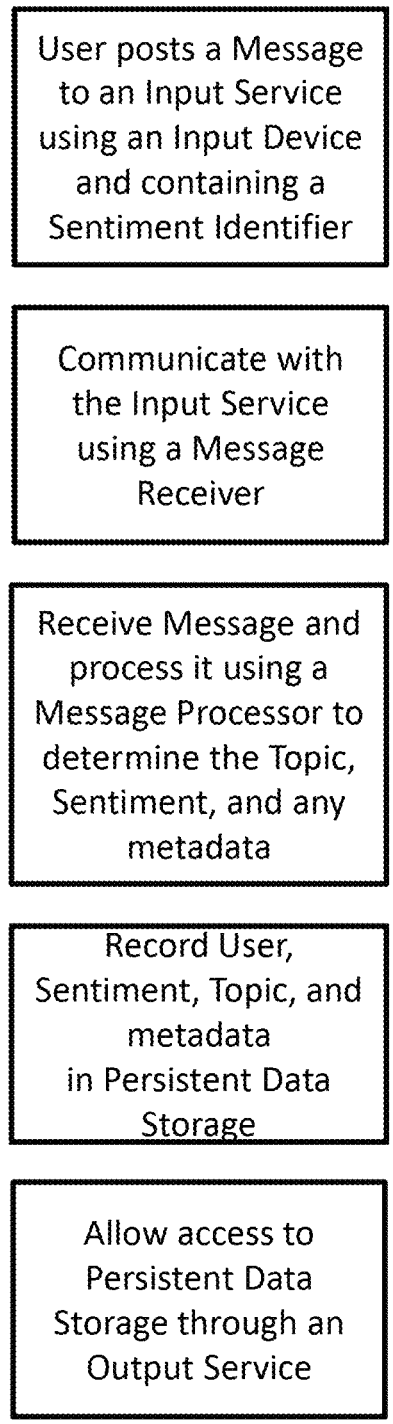
FIG. 3 is a flow diagram indicating a system for receiving and recording the Sentiment explicitly identified by a Sentiment Identifier in a message, posting, or other online communication according to some embodiments of the invention.
Figure 4:
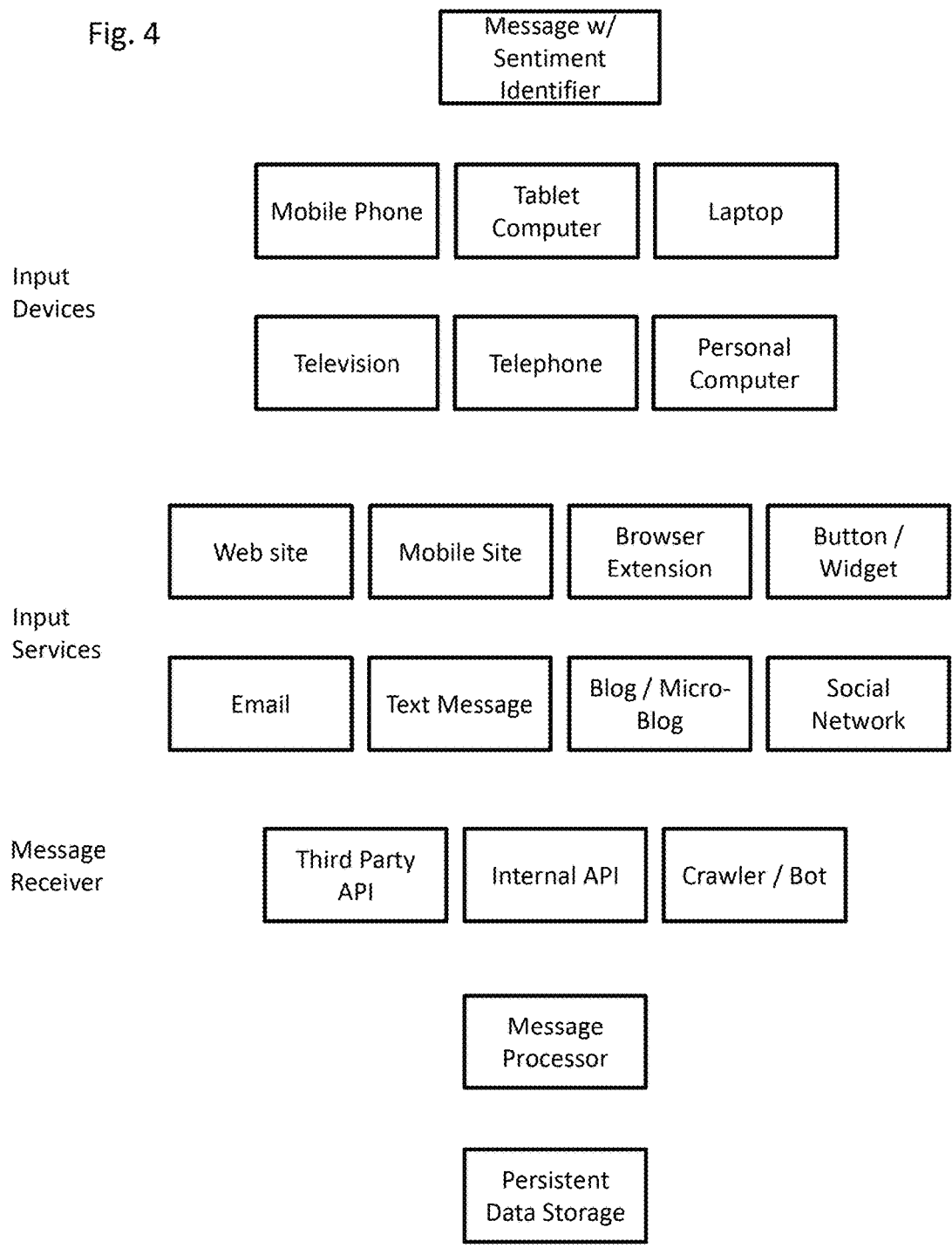
FIG. 4 depicts illustrative types of Input Devices, Input Services, and Message Receivers that can be used in systems according to some preferred embodiments of the invention.

For illustrative purposes, FIG. 2 depicts components of a system according to some illustrative embodiments for allowing users to express their explicit sentiment within a message, post, or other online communication and for tracking and recording these sentiments. The System 200 includes an Input Device 240 via which a User 210 inputs a Message 220 having a Sentiment Identifier 230, an Input Service 250, a Message Receiver 260, a Message Processor 270, a Persistent Data Storage 280, and an Output Service 290. In some implementations, the User 210 posts a Message 220 containing a Sentiment Identifier 230 on an Input Service 250 using an Input Device 240. The Message Receiver 260 communicates with the Input Service 250 to receive the Message 220 and pass it to the Message Processor 270. The Message Processor 270 parses the Message 220 to determine if it accurately includes a Sentiment Identifier 230 and Sentiment and determines what data and metadata to store in the Persistent Data Storage 280. The data and metadata stored in the Persistent Data Storage 280 are accessible in various forms through the Output Service 290. By way of example, the stored data can include, e.g., data specifically contained within said message, including, e.g., related to the Topic (such as, e.g., a particular character string) and the Sentiment (such as, e.g., a particular numerical value), as well as data pertaining to the User. Moreover, the metadata can include, e.g., any data about or related to the data, such as, e.g., data related to user preferences, friends and/or other data associated with such data.

In the preferred embodiments, the User 210 includes any user posting a Message 220 that utilizes a Sentiment Identifier 230 as described herein for identifying his/her sentiment about him/herself or about a specified topic.

In the preferred embodiments, the Message 220 includes a blog post, micro-blog post, bulletin board comment, status update, text message, tweet, social network posting, or other communication through the Internet, a mobile phone network, or other network of connected devices, including but not limited to postings on Facebook or tweets on Twitter. In the preferred embodiments, the Sentiment Identifier 230 is a symbol, such as an asterisk, used in conjunction with the word, phrase, or number that represents the Sentiment within that Message 220.

In some preferred embodiments, Users are pre-notified of pre-defined syntax rules in relation to use of Sentiment Identifiers, Sentiments, Topic Identifiers and Topics. In some preferred examples, such syntax rules can be advertized or displayed on a web site. By way of example, in some embodiments a server computer is configured to present a web site accessible to users executing browser software on user input devices, which web site can include a page displaying rules, such as, displaying:

"To indicate your sentiment on a topic within a message.
1. Type #, directly followed by your alphanumeric topic and ending with a space;
2. Type *, directly after your topic followed by a sentiment number in a range between 0-10 (where 0=hate and 10=love)."

Among other things, the preferred embodiments provide very easily described and followed syntax structure readily used by a user and also readily processed by a system according to the present invention.

In some preferred embodiments, an Input Device 240 is provided that includes a mobile phone, tablet computer, laptop, personal computer, television, telephone, or other device that is connected to or otherwise communicates with, the Internet, a mobile phone network, or other network of connected devices. The User 210 inputs the Message 220 on the Input Device 240 in order for it to be posted on an Input Service 250.

In some preferred embodiments, an Input Service device is provided, such as, e.g., one or more computer (e.g., a server computer or the like) that is configured to provide an Input Service 250. In the preferred embodiments, the Input Service 250 includes a website, blog, micro-blog, bulletin board, social network, SMS service, button, widget, or other software, including Twitter, Facebook, and Google+, through which Users 210 may post or share Messages 220. In some preferred embodiments, the Input Service 250 transmits or communicates the Message 220 from the User 210 to one or more other users of the Input Service 250, or groups of users, or the general public, or directly to the Message Receiver 260.

In some preferred embodiments, a Message Receiver device is provided, such as, e.g., one or more computer (e.g., a server computer or the like) that is configured to operate as a Message Receiver 260. In the preferred embodiments, the Message Receiver 260 includes an Application Programming Interface (API), crawler, bot, or other software that either actively reads, scrapes, or crawls the Input Service 250 looking for Messages 220 that utilize a Sentiment Identifier 230, or otherwise receives Messages 220 from or by way of the Input Service 250. In some embodiments, the Message Receiver 260 includes an Application Programming Interface (API) run by the Input Service 250, such as, by way of example, Facebook™. In some examples, the API transmits or communicates Messages 220 that have been posted via the Input Service 250 to the Message Processor 270. In other embodiments, the Message Receiver 260 includes an internal API, which queries an Input Service 250 on a regular or consistent basis to request Messages 220 and then direct them to the Message Processor 270. In other embodiments, the Message Receiver 260 is a "crawler" or "bot"—a piece of software that reads data on an Input Service 250 in order to identify Messages 220 and feed them to the Message Processor 270. In some preferred embodiments, the Message Processor 270 includes, e.g., one or more computer (e.g., a server computer or the like). While the Message Receiver device and the Message Processor 270 can be separate or independent devices, in some embodiments the Message Receiver device and the Message Processor 270 can be provided on or by the same computer server or set of computer servers. In the preferred embodiments, the Message Processor 270 receives Messages 220 from the Message Receiver 260 and includes a script or other software on a computer server or set of computer servers that parses, sorts, and analyzes the Messages 220 to determine their User 210, Sentiment Identifier 230, and Sentiment, as well as their Topic Identifier and Topic (if any). In preferred embodiments, the Message Processor 270 also weeds out any false positives or other Messages 220 that appear to include a Sentiment Identifier 230 but do not. The Message Processor 270 then determines what data and metadata from a Message 220 gets stored in the Persistent Data Storage 280. In some examples, in order to weed out false positives, the system can perform the following steps: 1) isolate characters within i) an identified Topic, ii) an identified Sentiment and/or iii) identified text adjacent said identified Topic and/or identified Sentiment; 2) automatically run electronic grammatical, spelling and/or dictionary comparison(s) and identify definitions or meanings of such isolated characters; 3) weed out as false positive cases in which an identified Topic, identified Sentiment or identified text is determined to have no or uncertain meaning, or is determined to be unlikely due to conflicting with other inputted user data (e.g., such as if meaning of Topic, Sentiment or text has some uncertainty and value conflicts with recent data of the user and/or conflicts with a profile of data input by the user), or is identified as falling into a category that is deemed improper or otherwise automatically weeded out (e.g., whether based on pre-set general standards, such as, e.g., to preclude obscenity, to preclude inciting of violence or the like, or whether based on pre-set user standards by which a user can input general rules by which the system can avoid generating user Sentiment in contexts in which the user does not desire or intend such Sentiments—such as, e.g., based on user input in response to identifying by the user of false identifications in some contexts, such as, e.g., if a user makes frequent posts of a nature that may include certain characters, the user can input a rule in preferences identifying characters and other words used in proximity thereto that are not intended to be Topics or Sentiments.

In some embodiments, systems and methods for transmitting or communicating messages to the Message Processor and for the Message Processor to parse and analyze messages can employ features as described in the following U.S. published applications and patents, the entire disclosures of each of which are incorporated herein by reference: (1) U.S. Patent Publication No. 2011/0119133A1 published May 19, 2011 entitled System and Method for Adding Advertisements to a Location-Based Advertising System; (2) U.S. Patent Publication No. 2012/0272160 published Oct. 25, 2012 entitled System and Method for Analyzing Messages in a Network or Across Networks; (3) U.S. Pat. No. 6,820,081 issued Nov. 16, 2004 entitled System and Method for Evaluating a Structured Message Store for Message Redundancy; (4) U.S. Pat. No. 8,566,309 issued Oct. 22, 2013 entitled Monitoring Hashtags in Micro-Blog Posts to Provide One or More Crowd-Based Features; (5) U.S. Pat. No. 8,688,791 issued Apr. 1, 2014 entitled Methods and Systems for Analysis of Real-Time User-Generated Text Messages.

In the preferred embodiments, the Persistent Data Storage 280 includes a data storage and retrieval system on a computer server or set of computer servers, such as a database, in which the User 210, Sentiment Identifier 230, Sentiment, Topic Identifier, Topic, and any other associated information and metadata is stored.

In some preferred embodiments, a Output Service device is provided, such as, e.g., one or more computer (e.g., a server computer or the like) that is configured to operate as a Output Service 290. In the preferred embodiments, the Output Service 290 includes a mechanism for providing an output or product for a user, partner, client or customer, such as, by way of example, reports, graphical representations, data visualizations and/or other representations of information pertaining to recorded data within the Persistent Data Storage 280 and can include, for example, a website, mobile web site, mobile application, and/or an electronic message that presents such output or product for the user, partner, client, or customer to receive and/or access information related to the data stored in the Persistent Data Storage 280.

In some preferred embodiments, one or more, or even all, of the Input Service device, the Message Receiver device, the Message Processor, the Output Service device and the Persistent Data Storage 280 can be located on or contained within the same set of one or more computer (e.g., server computer or the like).

In some preferred embodiments, a User posts a Message using his/her mobile phone (the Input Device) on the Twitter service (the Input Service) using a hashtag as the Topic Identifier and Topic of the tweet, an asterisk as the Sentiment Identifier, and a number on a scale from 0 to 10 (with 0 representing "hate", 5 representing "neutral", and 10 representing "love") as the Sentiment. For example: "Really liking #starbucks now that they've switched to eco-friendly packaging * 8". The Message is received through the Twitter API (the Message Receiver), and parsed by software on a computer or series of computers (the Message Processor). The Topic, Sentiment, and other data related to the Message are then stored in a Persistent Data Storage and presented back to various users through a web site (the Output Service).

In other embodiments, the User may use a laptop, tablet, personal computer, television, or other Input Device with which to input the Message.

In other embodiments, the User may use Facebook, Google+, or another social network as their Input Service through which they input their Message.

In other embodiments, the User may use WordPress, Blogger, or other blog software or service as their Input Service through which they input their Message.

In other embodiments, the User may use phpBB or other online forum or bulletin board software as their Input Service through which they input their Message.

In other embodiments, the User may use a widget, button, browser extension, bookmarklet, or other software as their Input Service through which they input their Message.

In other embodiments, the User may use email, SMS, or other texting service as their Input Service through which they input their Message.

In other embodiments, a Facebook API, Google+API, or other third party API may be used as the Message Receiver through which the Message is received from the User.

In other embodiments, "scraper" software or other software may be used as the Message Receiver to "scrape" public feeds of Messages in order to receive the Message from the User.

In other embodiments, an API may be used as the Message Receiver to receive the Message from the User.

In other embodiments, a web site may be used as the Message Receiver through which the Message is received from the User.

In other embodiments, a mobile web site or mobile application may be used as the Message Receiver through which the Message is received from the User.

In some embodiments, the system creates a database of user opinions based on various messages transmitted in accordance with embodiments of the invention, wherein the system extracts the relevant user data within the messages and stores such data within such database. By way of example, an owner, such as, e.g., Tengrade™, can manage a server that performs functions described herein to compile such a database. Moreover, in the preferred embodiments, the system can provide one or more of a plurality of "outputs" or "products" utilizing the data within this database. By way of example, such outputs or products can include a variety of graphical or other representations of the data (such as, e.g., reports, data visualizations, etc.) and the outputs or products can be implemented or provided in a variety of ways, such as, e.g., by presenting such outputs or products via a website, a mobile web site, a mobile application, a graphical user interface, and/or via a transmitted message (such as, e.g., as an attachment to or within the body of a reply message such as, e.g., an email, a text message a tweet and/or the like), through which a user, partner, client, and/or customer may receive or access information pertaining to the data stored in the Persistent Data Storage. In some embodiments, such outputs or products can take the form of various outputs or products as described in the above-noted U.S. application Ser. No. 13/831,375 incorporated herein by reference, such as, e.g., by presented reports, data visualizations or the like similar to described in said application, such as, by way of example, employee similar Tornado™ representations of data or the like as described in said application.

In some illustrative embodiments, an output or product includes a reply message addressed to a User with the results of a Topic specified in the User's Message. For example, the User may receive a tweet reply message such as "@User #Topic: 7.2".

In some embodiments, the output or product includes a website, mobile web site, or mobile application on which the User can read the results of a specified Topic.

In some embodiments, the output or product includes a data visualization of results on one or more Topics, presented graphically. In some preferred embodiments, the output or product includes a tornado-like data visualization including a plurality of horizontal rows or "tranches" with each tranche representing a sentiment value, such as, e.g., in some embodiments employing 11 rows pertaining to respective whole numbers from 0 to 10. In some embodiments, the widths of such tranches are determined by the number of Topics that fall into each tranche.

In some embodiments, the output or product includes a data report, which may be accessible via a website, displaying the results of specified Topics.

In some illustrative embodiments, the data compiled in relation to user inputted Sentiments and Topics can be used to create: 1) response messages to users (such as, e.g., transmitting a message to a user in response to an inquiry that includes information regarding said Topics and Sentiments contained within a database); 2) a website posting containing graphs, reports, and/or data visualizations pertaining to the Topics and Sentiments contained within a database; and/or 3) other outputs or products, such as, e.g., other data visualizations, data reports, and/or access mechanisms to such data (such as, e.g., by providing a graphical user interface via which a user can enter search terms or can input requests for receiving or being presented with specific subsets of data and/or information, which sub-sets can include, by way of example, information specific to a) particular groups of users (such as, e.g., i) Facebook friends, ii) co-workers, iii) users with common sentiment values, iv) users of particular ages, demographics and/or psychographies), iv) particular categories or groups of topics, c) particular industries, d) particular dates, and/or e) otherwise demographically, geographically, chronologically or otherwise identified). For example, in some embodiments, the system can present the sentiments of users pertaining to various topics, pertaining to particular time periods, and/or by particular demographic or psychographic groups.

Additionally, it should be understood based on this disclosure that illustrative embodiments can be used to create various databases and/or to use such data bases to create reports and/or otherwise, as detailed in relation to the various embodiments set forth in the above-listed U.S. application Ser. No. 13/831,375 which is incorporated herein by reference. In some embodiments, systems and methods for creating reports based on data and metadata stored in persistent data storage can include systems and methods set forth in the following U.S. Patents, the entire disclosures of which are all incorporated herein by reference: (1) U.S. Pat. No. 8,650,587B2 issued Feb. 11, 2014 entitled Mobile Content Tracking Platform Apparatus and Systems; (2) U.S. Pat. No. 8,667,520 issued on Mar. 4, 2013 entitled Mobile Content Tracking Platform Methods.

Some further exemplary embodiments of the invention are described below in relation to FIG. 7 and in relation to FIGS. 8(A) to 8(C).

With respect to the example shown in FIG. 7, in some embodiments a plurality of Input Devices (100, 100B, 100C) are provided via which a user can input messages, in accordance with one or more embodiment described herein. In the illustrative embodiment shown in FIG. 7, a computer system for implementing functionality of the present invention includes an Input Services device 200, a Message Receiver device 300, an Output Services device 400 and persistent (e.g., non-transitory) digital data storage 500. In the embodiment shown in FIG. 7, the Message Receiver device includes functionality of the Message Processor 270 described above. It should be appreciated that in alternative embodiments, the Message Receiver device and the Message Processor can be contained within separate devices (such as, e.g., separate computer servers). Alternatively, in some embodiments one or more of the Input Services device, the Message Receiver device and the Output Services device could be provided on the same set of one or more computers (e.g., computer servers or the like). In some preferred embodiments, the users input messages containing pre-defined Topic Identifiers, Topics, Sentiment Identifiers and Sentiments in accordance with embodiments of the invention described herein into respective Input Devices (e.g., 100, 100B, 100C). Next, the Messages are received via the Input Services device 200 in accordance with embodiments of the invention described herein. Next, the Messages are received and parsed and processed via the Message Receiver device and the Message Processor in accordance with embodiments of the invention described herein, and data related to Topics, Sentiments and information related thereto, etc., is stored within the Persistent Data Storage 500 in accordance with embodiments of the invention described herein. Next, an Output Services device is provided that presents information related to said stored data to said users in accordance with embodiments of the invention described herein.

Figure 8A:
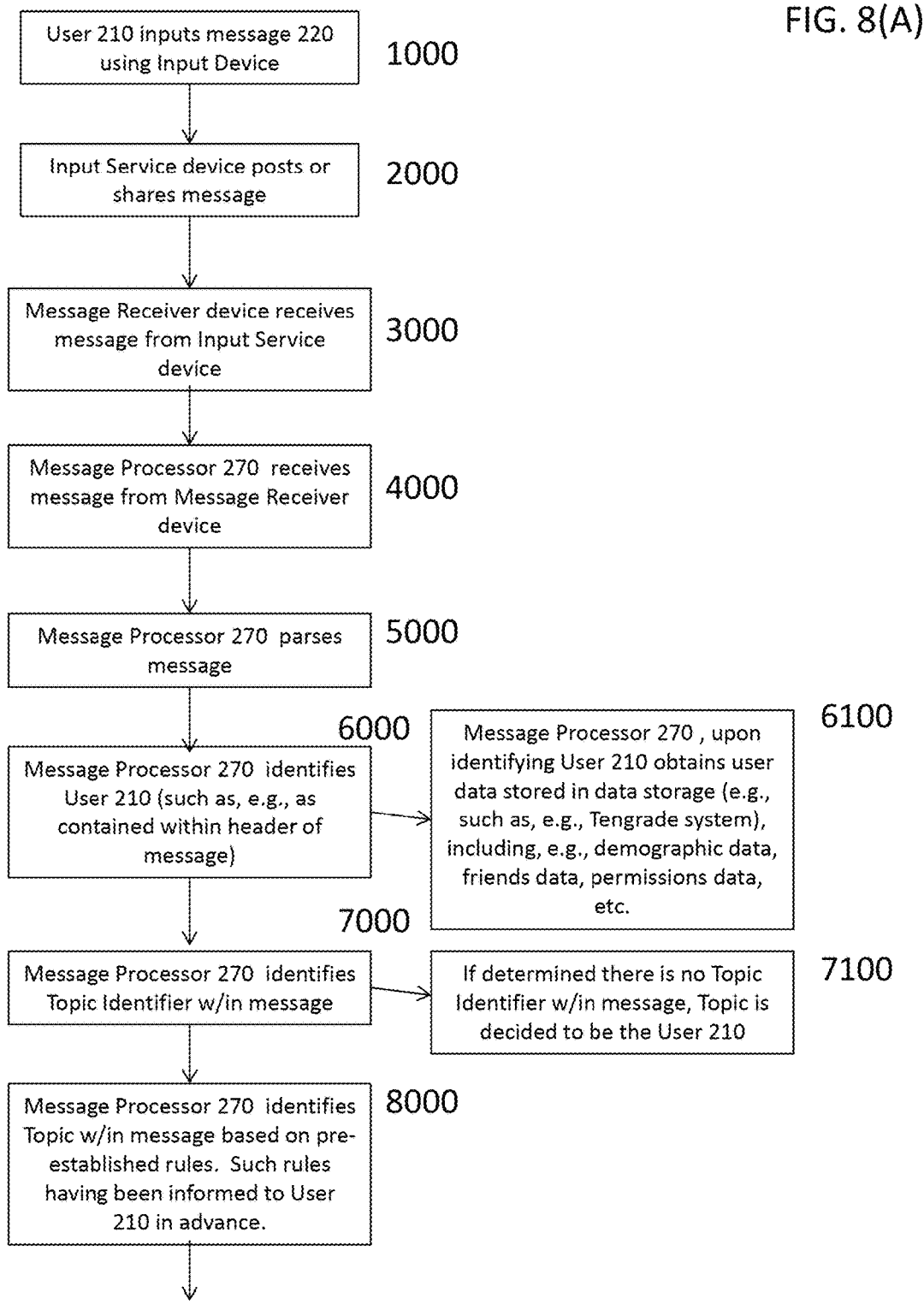
Figure 8C:
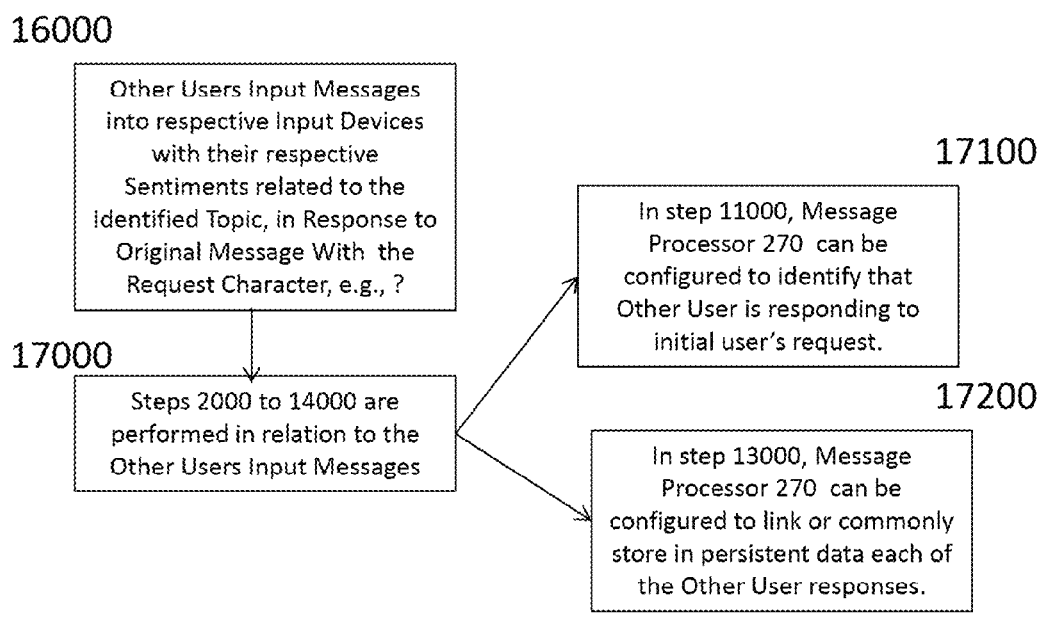
Figure 9:
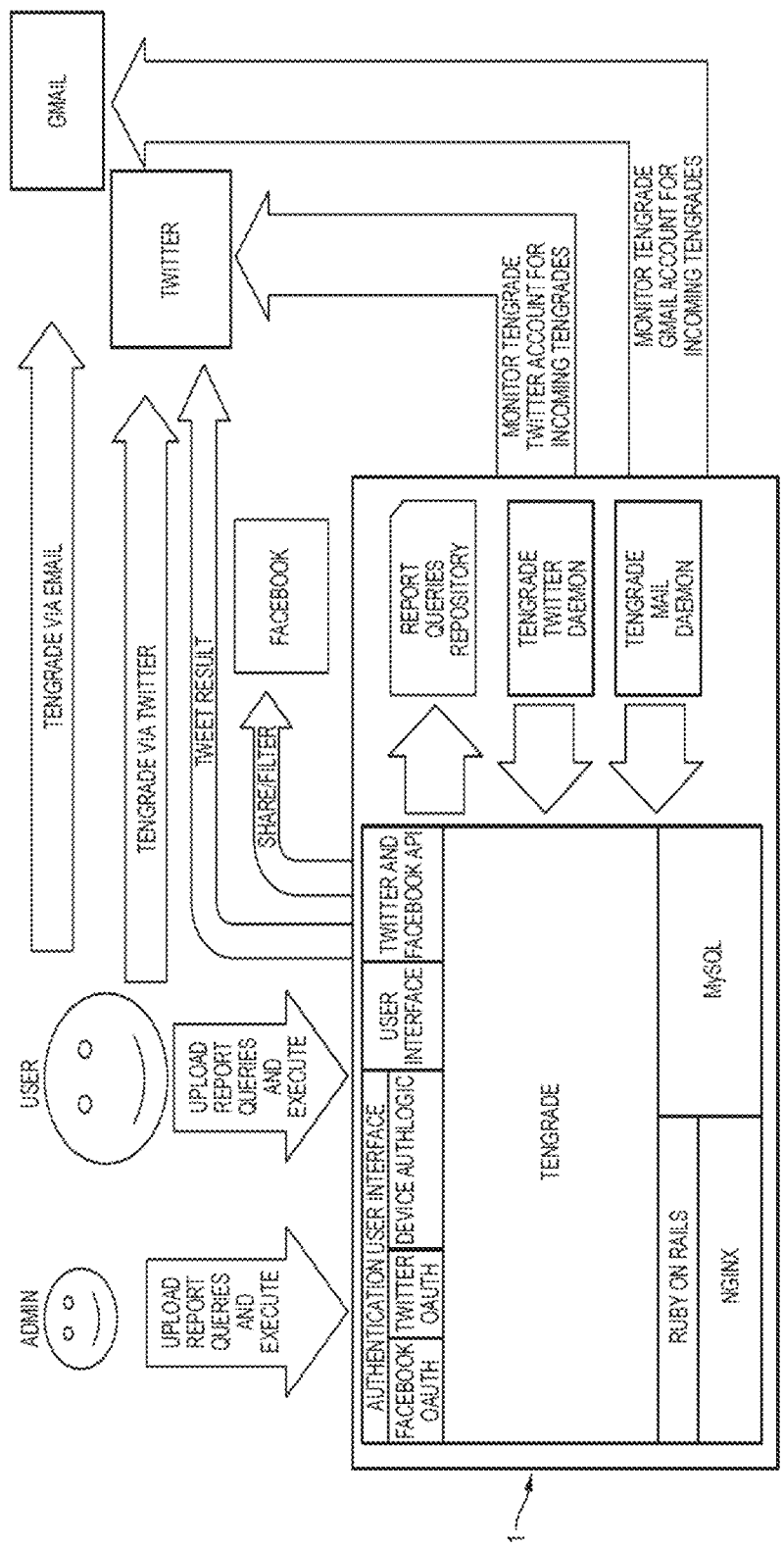
FIG. 9 is a copy of FIG. 1 of said co-pending U.S. application, which is a schematic diagram showing an illustrative Tengrade system functionality according to some examples.
Figure 10:
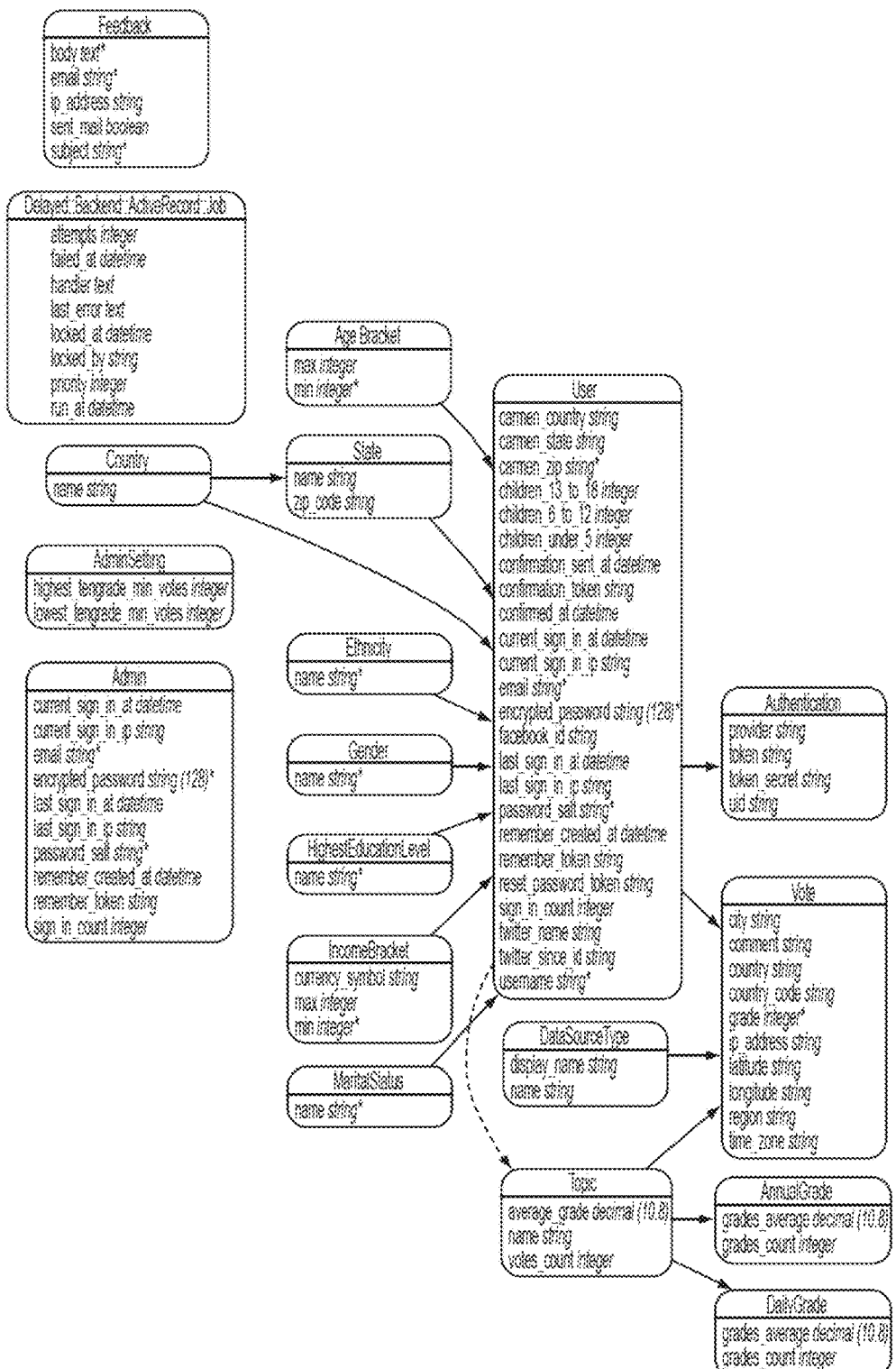
FIG. 10 is a copy of FIG. 2 of said co-pending U.S. application, which is a schematic diagram showing an illustrative database design according to some examples.
Figure 11:
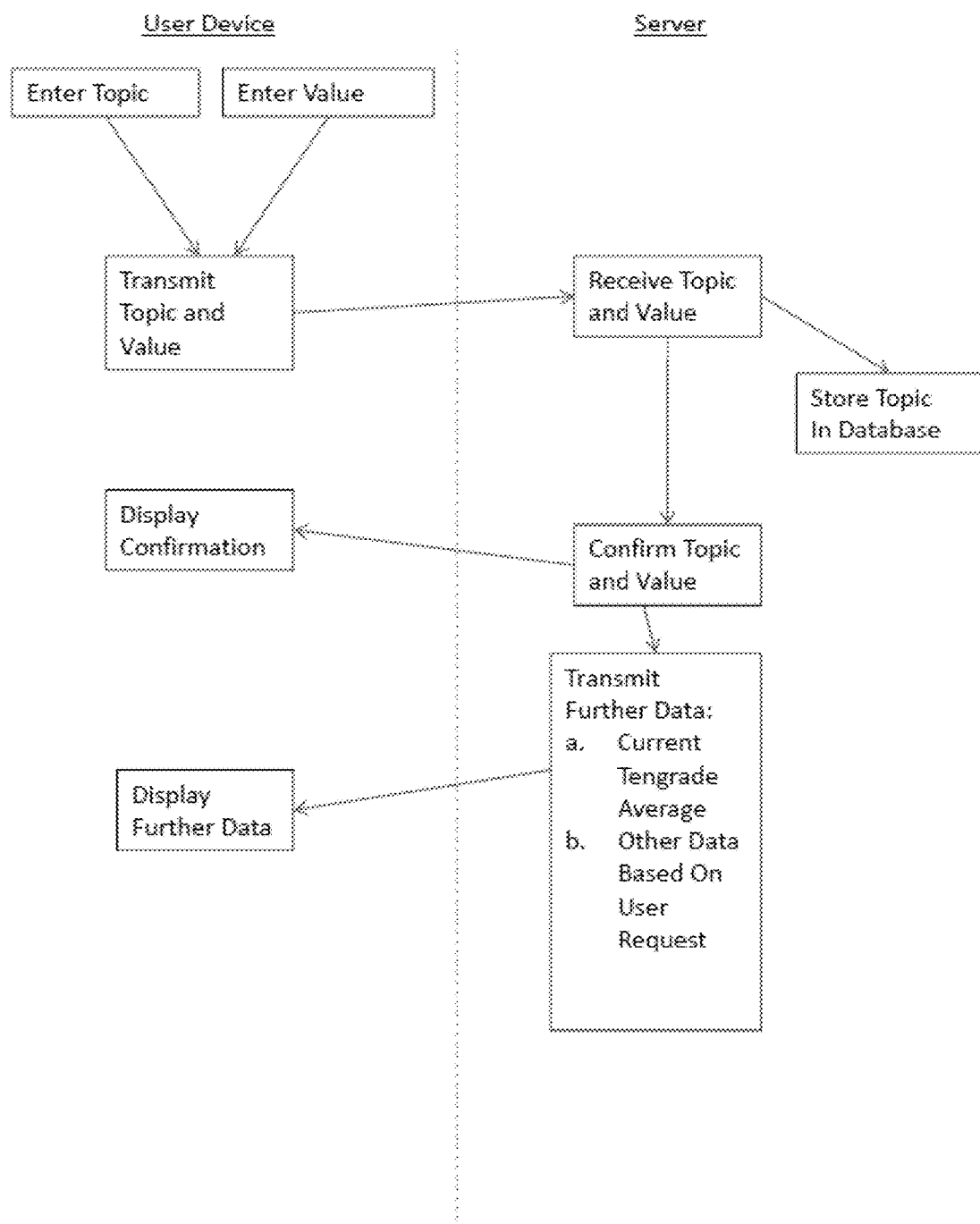
FIG. 11 is a copy of FIG. 5 of said co-pending U.S. application, which is an illustrative flow diagram depicting an illustrative flow during the rendering of a Tengrade submission by a user in which the user inputs the topic textually at a user device and transmits the same to a back end Tengrade server according to some examples.
Figure 12:
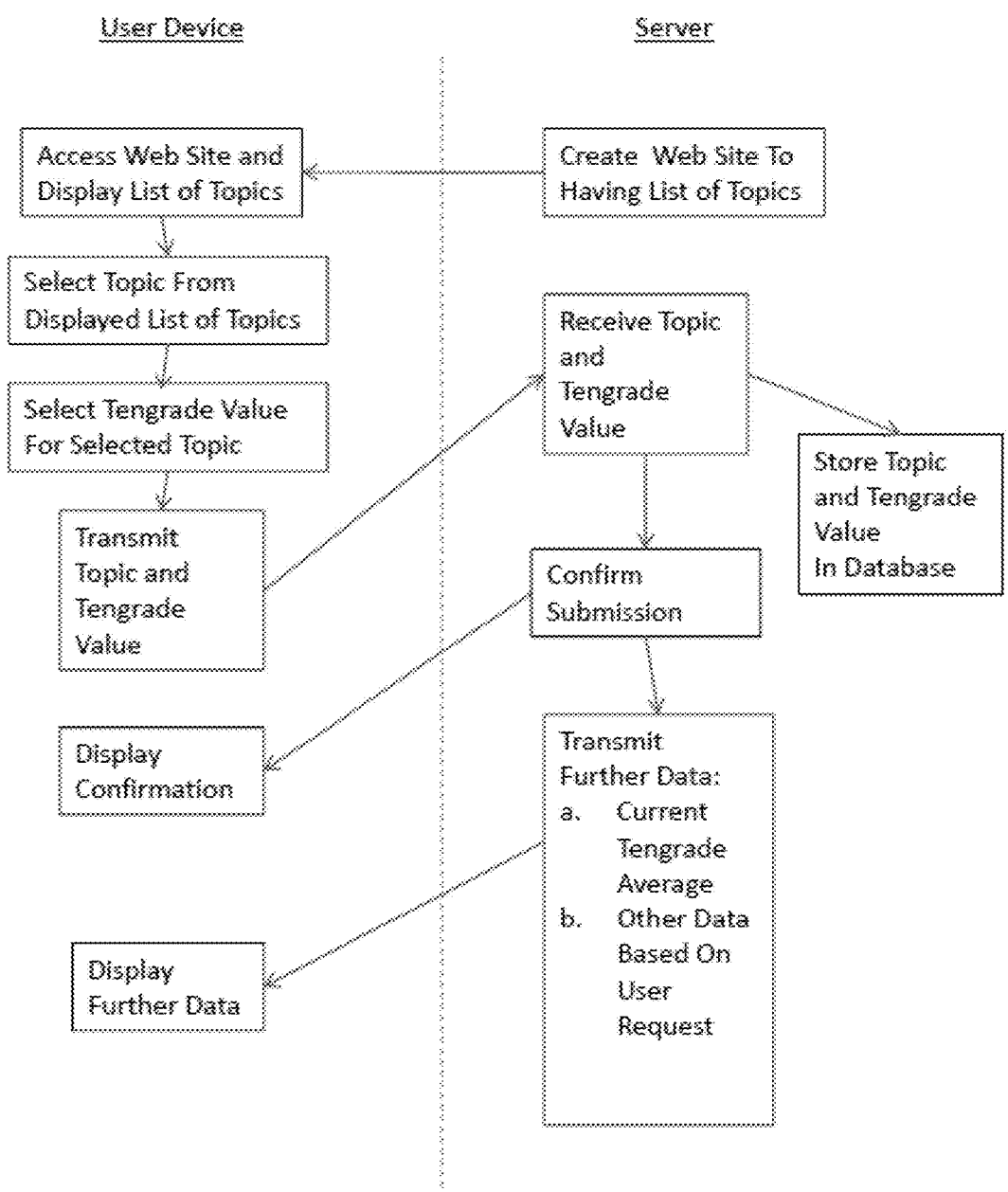
FIG. 12 is a copy of FIG. 6 of said co-pending U.S. application, which is an illustrative flow diagram depicting an illustrative flow during the rendering of a Tengrade submission by a user at a user device in which the user accesses a web site provided via a back end Tengrade server, selects topics from a list displayed, and enters Tengrade values, and transmits the same to the server according to some examples.
Figure 14:
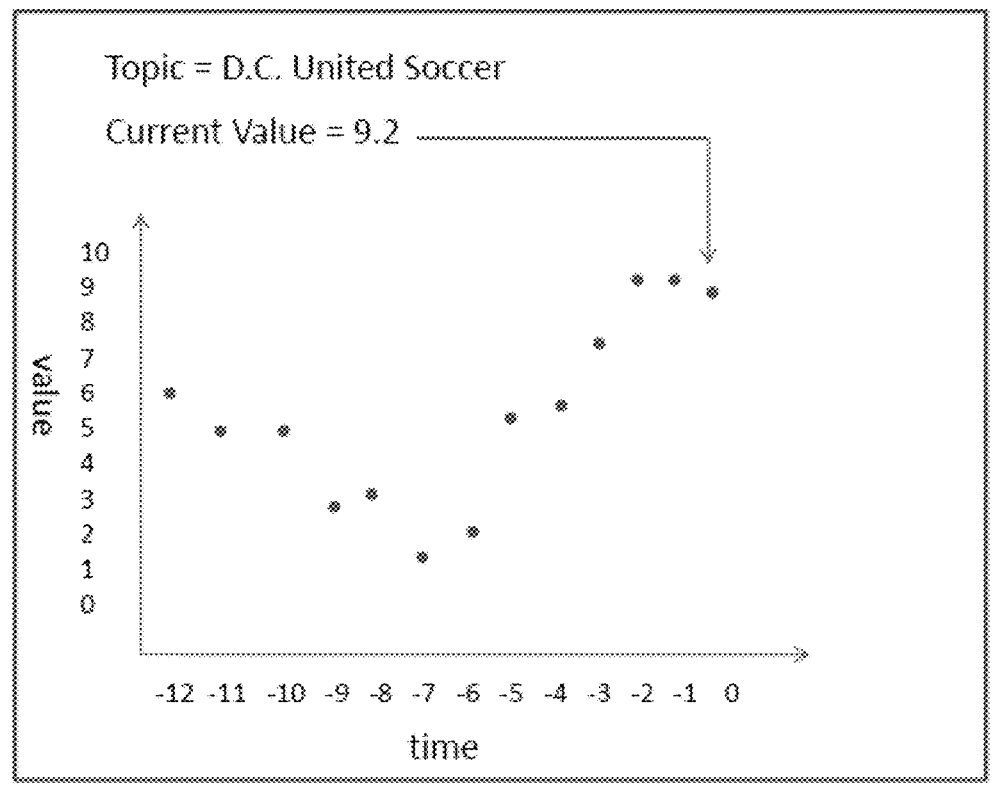
FIG. 14 is a copy of FIG. 9 of said co-pending U.S. application, which is an illustrative chart depicting an illustrative chart or graph that can be created in some illustrative examples.
Figure 15C:
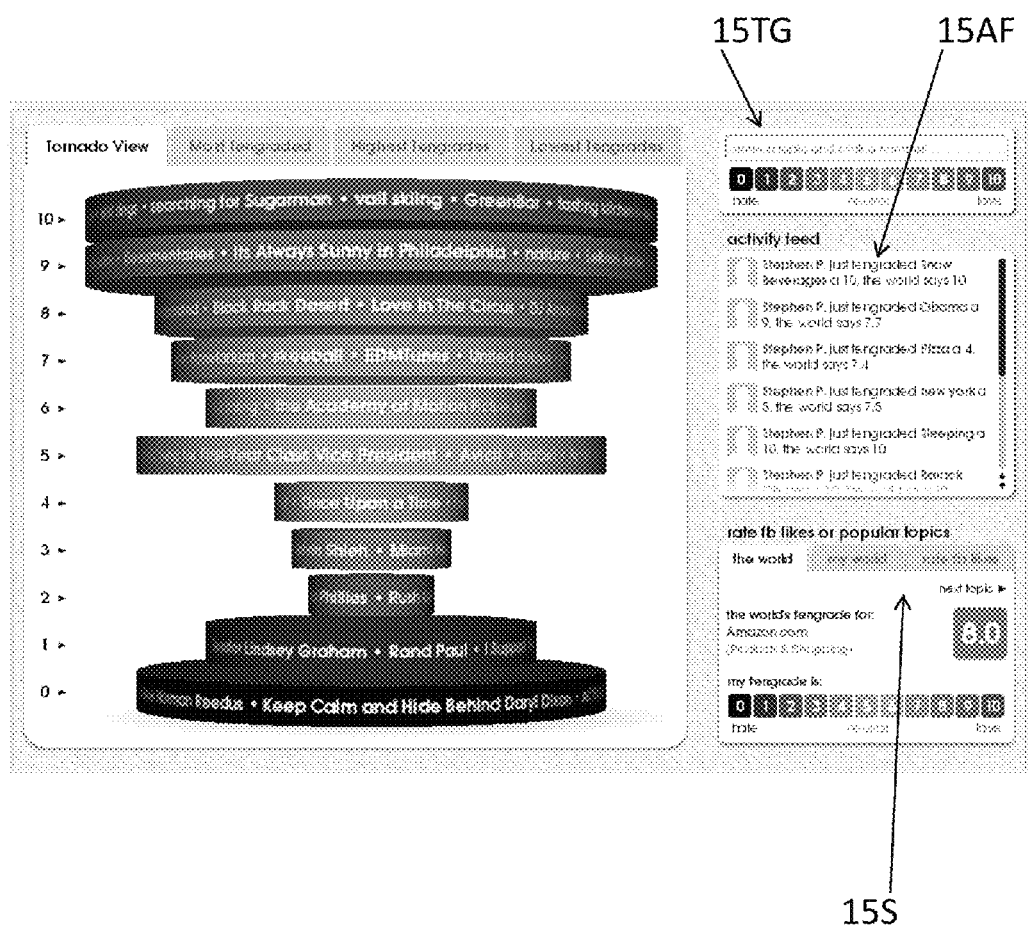
FIG. 15C is a copy of FIG. 15C of said co-pending U.S. application, which is an illustrative tornado-style display of rating profiles similar to that shown in FIG. 15(A) according to some illustrative examples.
Figure 16:
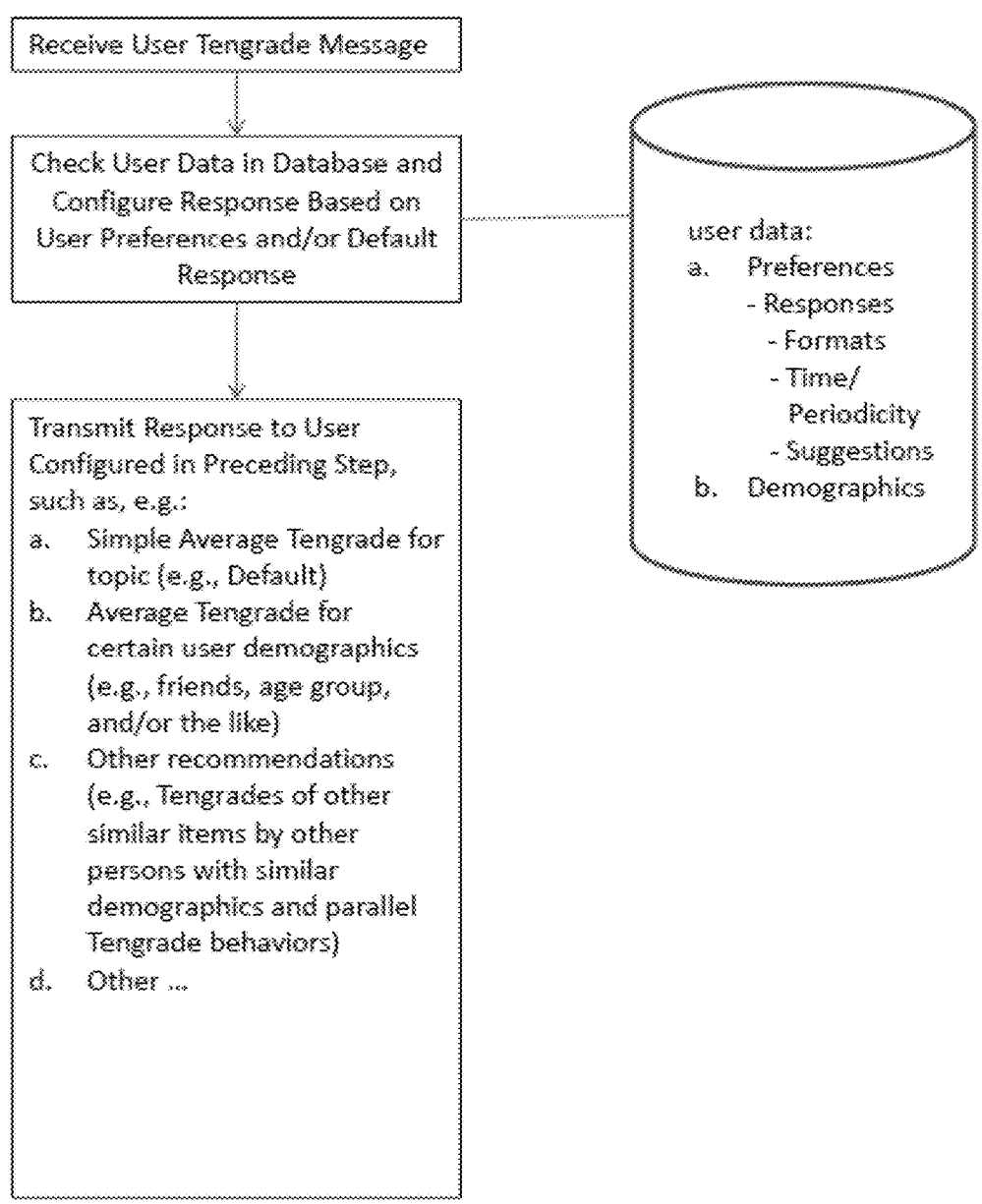
FIG. 16 is a copy of FIG. 10 of said co-pending U.S. application, which is
Figure 17:
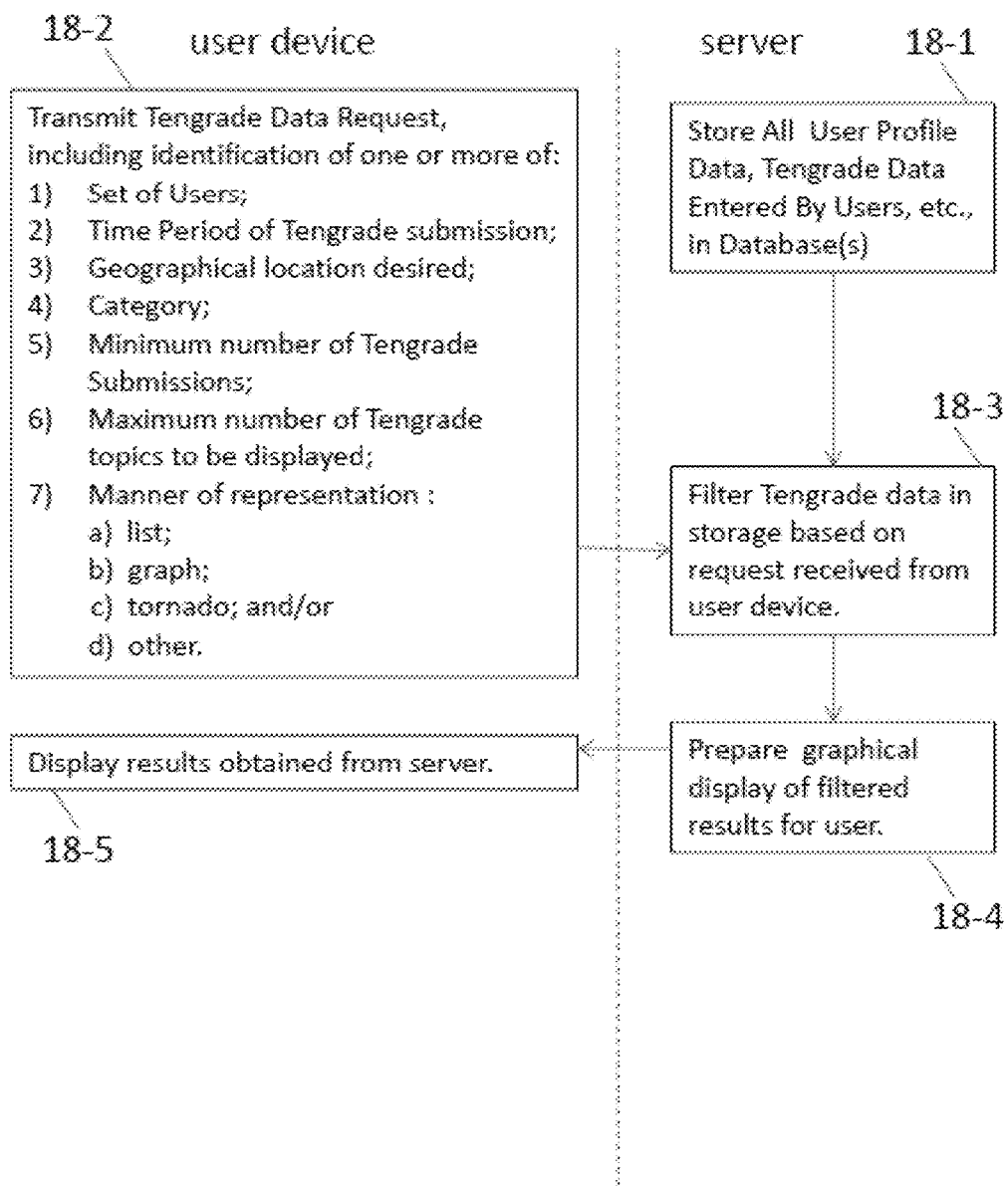
FIG. 17 is a copy of FIG. 18 of said co-pending U.S. application, which is an illustrative flow diagram showing some illustrative process steps according to some exemplary embodiments in which a user requests Tengrade rating information from a server.

With respect to the example shown in FIGS. 8(A) to 8(C), in some embodiments, a computer system according to the present invention can be configured to perform the following steps.

In a first step 1000, a User 210 inputs a Message 220 using an Input Device in accordance with embodiments of the invention described herein.

In a subsequent step 2000, an Input Service device receives the inputted Message and posts or shares the Message in accordance with embodiments of the invention described herein.

In a subsequent step 3000, a Message Receiver device receives the Message from the Input Service device in accordance with embodiments of the invention described herein.

In a subsequent step 4000, a Message Processor 270 receives the Message from the Message Receiver device in accordance with embodiments of the invention described herein. In some embodiments, such as, e.g., in embodiments shown in FIG. 7, the Message Processor 270 can be part of the same device as the Message Receiver device, and, in which case, it would not be required to transmit the message from a Message Receiver to a Message Processor, and the Message Receiver device could be configured to perform functionality of the Message Processor (such as, e.g., performing steps 5000, et seq., shown in FIGS. 8(A) to 8(C)) without requiring transfer of the Message.

In a subsequent step 5000, the Message Processor parses the message in accordance with embodiments of the invention described herein.

In the step 6000, the Message Processor 270 identifies the User 210 in accordance with embodiments of the invention described herein. The manner of user identification can be varied depending on the type of message. For example, in some examples, the Message Processor 270 can identify a User 210 by examining a header of the Message and/or the Message can otherwise include an identification of the User 210 or can be received from the User 210 based upon an authentication procedure via which the User 210 is identified.

In the step 6100, upon identifying the User 210, in some embodiments, the Message Processor can be configured to retrieve user data stored in data storage, including, e.g., demographic data, friends data, permissions data, etc., in accordance with embodiments of the invention described herein, such as, e.g., such user information input by users into a Tengrade computer system in some illustrative embodiments.

In the step 7000, the Message Processor 270 identifies a Topic Identifier contained within the Message in accordance with embodiments of the invention described herein.

In the step 7100, in some embodiments, if the Message Processor determines that there is no Topic Identifier within the Message, the Message Processor can assign a Topic based on a pre-established rule, such as, e.g., to assign the Topic as being the User 210.

In the step 8000, the Message Processor 270 identifies the Topic within the Message based on pre-established rules, such as, e.g., based on proximity to the Topic Identifier, etc., in accordance with embodiments of the invention described herein. In preferred embodiments, as described hereinabove, such pre-established rules are informed to the User 210 in advance, such as, e.g., by posting of such rules in advance online via a web page or the like in accordance with embodiments of the invention described herein.

In the step 9000, the Message Processor 270 identifies the Sentiment Identifier within the Message in accordance with embodiments of the invention described herein.

In the step 10000, the Message Processor 270 identifies the Sentiment within the Message based upon pre-established rules in accordance with embodiments of the invention described herein. In preferred embodiments, as described herein-above, such pre-established rules are informed to the User 210 in advance.

In the step 11000, the Message Processor 270 obtains data related to the Identified User 210, the Identified Topic, and the Identified Sentiment in accordance with embodiments of the invention described herein.

In the step 12000, the Message Processor 270 weeds out false data in accordance with embodiments of the invention described herein.

In the step 13000, the Message Processor 270 stores data and metadata related to the Identified User 210, the Identified Topic, the Identified Sentiment and/or other data related thereto within the Persistent Data Storage 14000 in accordance with embodiments of the invention described herein.

In some embodiments, as shown at step 15000 in some implementations in which a user can employ a Sentiment Request indication, such as, e.g., the use of a question mark "?", the system can be configured to perform the following processing. If Message Processor 270 identifies the Sentiment as a Sentiment Request indication (such as, e.g., a value ?), the Message Processor 270 can: (1) determine not to store data and metadata related to said Message into persistent data storage, or store such data in persistent data storage along with meta data identifying such as a request for Sentiments to enable replies to be correlated with said request but without said identified value (i.e., ?) being displayed as a sentiment nor incorporated into output or reports; and/or (2) initiate transmission of messages to other users seeking such other users input of Sentiments related to the identified Topic, such as, e.g., forwarding a message or a reminder message to addressees identified within the message (e.g., within a message header or the like) or forwarding a message to a pre-defined group of recipients (e.g., to pre-identified recipients or pre-associated friends of the user).

With reference to FIG. 8(C), in some embodiments, in response to a User 210 inputting a Message employing a Sentiment Request indication (e.g., "?"), as shown at step 16000 other users can input Messages into respective Input Devices with their respective Sentiments related to the Identified Topic in accordance with embodiments of the invention described herein. In some embodiments, such other users can initiate such inputting of reply messages upon observing the original user's Message employing the Sentiment Request indication. In some embodiments, such other users can initiate such imputing of reply messages in response to receipt of a message or reminder from the Message Processor 270 received in embodiments employing step 15000.

As shown at 17000 in FIG. 8(C), after the step 16000, the above-noted steps 2000 to 14000 can be performed in relation to the other users input messages. As shown at 17100 in FIG. 8(C), in some embodiments the step 11000 can include that Message Processor 270 is configured to identify that a respective other user is responding to an initial User's request. For example, in some embodiments, the other user Message can be identified by the Message Processor 270 as responding to first User's Message (e.g., depending on mechanism of transmission, such identity can be within a message header or the like), the other user can be identified as a friend of first User (e.g., based on user data including friend's data), and/or based on same Topic and timeliness. As shown at 17200 in FIG. 8(C), in some embodiments the step 13000 can include that Message Processor 270 can be configured to link or commonly store in persistent data, each of the other user responses in accordance with embodiments of the invention described herein.

In illustrative embodiments, upon gathering and storing of compilations of user data within the persistent data storage 14000, the system can be configured to provide various outputs or reports for users in accordance with various embodiments of the invention described herein.

Figure 6:
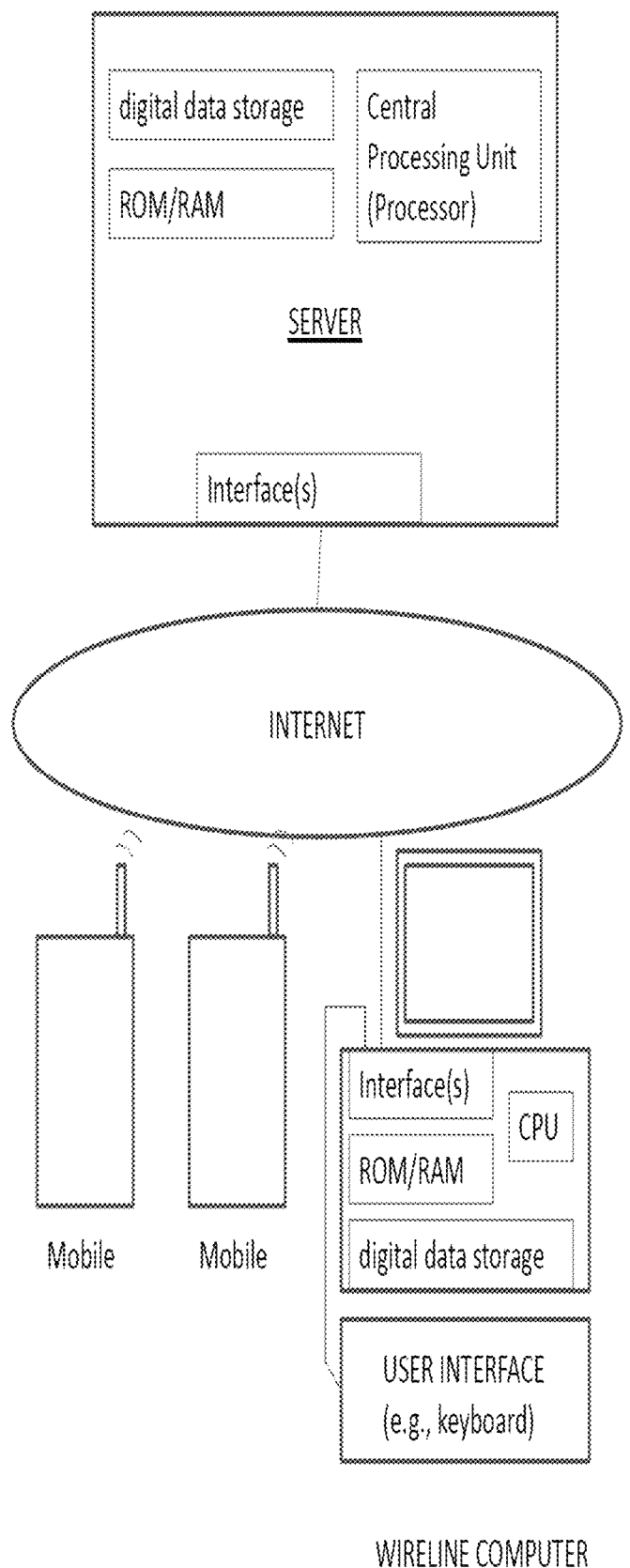
FIG. 6 depicts an illustrative server computer, having, e.g., at least one communication interface, digital data storage, read only memory (ROM), random access memory (RAM), and a central processing unit or processor that can be used to perform functionality according to some preferred embodiments of the present invention.

Illustrative System Architecture:

By way of example, FIG. 6 depicts illustrative system components that can be used to carry out functionality according to some of the preferred embodiments of the invention. In particular, as shown a server computer is provided that is programmed to perform functionality of such embodiments of the invention. For example, one or more such server computer could be used for implementing an Input Service device, a Message Receiver device, a Message Processor, and/or an Output Processor according to embodiments herein. In that regard, as depicted, in some embodiments, a server computer includes, e.g., at least one communication interface, digital data storage, read only memory (ROM), random access memory (RAM), and a central processing unit or processor that can be used to perform functionality according to such embodiments of the present invention. As also illustrated in FIG. 6, in some embodiments, the server computer is preferably configured to communicate via the Internet and/or other computer network to provide a Web Site or other graphical user interface that can be accessed remotely by users, such as, e.g., via user's mobiles (such as, e.g., cellular telephones, PDAs, notebook computers, tablet computers (such as, e.g., IPAD or KINDLE), desk top computers and/or the like). As shown in FIG. 6, in some embodiments such users can communicate via the Internet or the like to access the Web Site (such as, e.g., wirelessly and/or via a wireline connection). And, as also depicted, the user devices preferably include user interfaces for inputting of alphanumeric information (e.g., text), a digital display or monitor for presenting graphical user interfaces, and includes other user interface means, such as, e.g., a mouse, touch pad or touch screen and/or other known mechanisms for user input. As also depicted, such user devices would include communications interface(s) (e.g., wireless and/or non-wireless), data storage and memory (RAM and ROM) and a processor for performing the functional operations of the device based on data stored in digital data storage and/or memory.

For reference, the Internet is a world-wide network of computers that are linked together through a variety of media (e.g., wires, air {wirelessly}, etc., such as, e.g., including telephone wires, satellite links, etc., and which employ a common protocol for communication. In general, computers communicating via the Internet include a) server computers and b) client user computers. Servers include specialized computers that store information, share information with other servers, and make this information available to the general public via their client user computers. Client user computers are remote computers that run browser software (such as, e.g., EXPLORER, GOOGLE CHROME, NETSCAPE, etc.), with which users access the Internet via the so called world wide web. Typically, when a user accesses the Internet, the user initially accesses a special server provided and operated by an Internet Service Provider, through, e.g., an Access Point. The ISP Server provides the connection between one's client user computer the rest of the Internet. For example, ISP servers receive requests from client user computers (via their browsers) to view Web Pages, etc. And, such ISP servers connect to other Internet servers that, e.g., host various operations, such as, e.g., operations of various web sites, such as, e.g., Facebook, Twitter, Google, etc., which are hosted on various other servers. In short, when a user views a web page using the browser software executing on their computer, the following steps typically occur: 1) The user enters the address or URL into the browser software (e.g., by typing or clicking on a hyperlink with such information); 2) The browser software sends a request to the ISP server for the page; 3) The ISP server looks in a database of Internet addresses, finds the host server which houses the website in question, and sends that host server a request for the page; 4) The host server sends the requested page to the ISP server; 5) And, the ISP server sends the page to the user's browser, which, in turn, displays the same on the user's device display screen.

Figure 5:
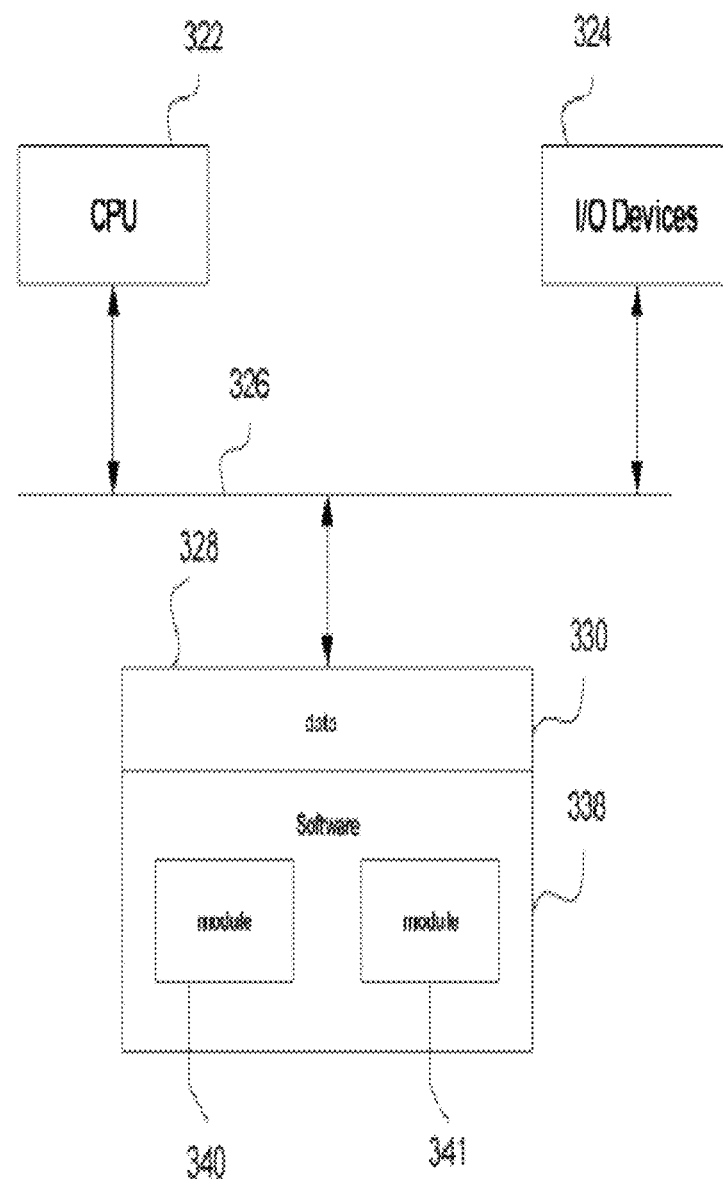
FIG. 5 is an illustrative architectural diagram depicting an illustrative computer or control unit that can be used to implement computerized process steps, to be carried out by devices employed in some embodiments of the present invention.

FIG. 5 shows an illustrative computer or control unit that can be used to implement computerized process steps, to be carried out by devices employed in some preferred embodiments of the present invention, such as, e.g., the one or more computer servers described herein, including, e.g., the Tengrade server, the various user devices (such as, e.g., a mobile device, a lap top computer, a desk top computer, etc.) and/or any other computing device. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Broad Scope Of The Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. Moreover, it should also be appreciated that elements of the embodiments of the above-listed application Ser. No. 13/831,375 incorporated herein by reference can be combined with embodiments described herein, such as, e.g., in relation to creation of databases of data and/or the access, retrieval, transmission and/or use of said data within such databases, such as, e.g., for creation of reports and/or other outputs.

The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method implemented via a computer system, comprising:
    said computer system receiving a user inputted online digital message or posting including an indication of a sentiment within the message or posting using a user-inputted pre-defined explicit Sentiment Identifier proximate a user-inputted word, phrase or number that represents the Sentiment,
    and said computer system identifying said pre-defined explicit Sentiment Identifier and the Sentiment and storing data pertaining to said Sentiment in non-transitory digital data storage, and
    said computer system receiving within said message or posting a null value or no Topic Identifier input and the computer system assigning Topic based on identification of said null value or no Topic Identifier by the computer system.

2. The method of claim 1, wherein the Sentiment Identifier is a symbol.

3. The method of claim 1, wherein the Sentiment Identifier is a single character symbol other than alphanumeric letters and numbers.

4. The method of claim 3, wherein the Sentiment Identifier is a single character symbol depicted on a single key of a standard QWERTY keyboard.

5. The method of claim 3, wherein the Sentiment Identifier is a symbol selected from the group consisting of an asterisk, a tilde, and a caret.

6. The method of claim 2, wherein the Sentiment is represented by a number on a scale, in which each number refers to a level of sentiment.

7. The method of claim 6, wherein each number refers to a level of positivity or negativity.

8. The method of claim 3, wherein the Sentiment is represented by a number on a scale of whole numbers from 0 to 10, in which 0 represents highest negativity (hate), 5 represents neutrality, and 10 represents highest positivity (love).

9. The method of claim 5, wherein the Sentiment Identifier is an asterisk.

10. The method of claim 1, further including said computer system receiving within said message or posting a user inputted Topic Identifier proximate the Sentiment Identifier and Sentiment.

11. The method of claim 1, wherein the Topic is the user.

12. A method implemented via a computer system, comprising:
    said computer system receiving and storing in non-transitory digital data storage a user inputted online digital message or posting including a communication informing other users and/or servers that the User would like to know other users' Sentiments on a particular Topic, using a question mark in conjunction with an explicit Sentiment Identifier.

13. The method of claim 12, further including said computer system receiving a plurality of inputted online reply communications from said other users, each respective said reply identifying their respective Sentiment using a user-inputted explicit Sentiment Identifier proximate a user-inputted word, phrase or number that represents their respective Sentiment.

14. The method of claim 12, wherein the Sentiment Identifier is an asterisk.

15. The method of claim 10, further including storing data related to said Topics, Sentiments, and related information in a database, and the computer system receiving a query from a user for information related to said data.

16. A system for allowing users to express their explicit sentiment within a message, post, or other online communication and for tracking and recording these sentiments, comprising:

an Input Device configured to receive a user-inputted Message that is sent or posted by a User using the Input Device;

said Message including a Sentiment Identifier that explicitly identifies a Sentiment that is expressed in said Message and a Topic Identifier that explicitly identifies a Topic that is also expressed in said Message, said Topic Identifier being in proximity to and in a defined order with respect to said Sentiment Identifier such as to enhance system processing speed and accuracy;

an Input Service with which the Message is posted or sent;

a Message Receiver that receives the Message from the Input Service;

a Message Processor that parses the Message to identify the User, Topic, and Sentiment based on said proximity and defined order;

a Persistent Data Storage in which the parsed Message data are stored; and an Output Service with which the parsed Message data is accessible.

* * * * *